April 26, 1966 J. E. DAMMANN ETAL 3,248,705

AUTOMATIC EDITOR

Filed June 30, 1961 4 Sheets-Sheet 1

INVENTORS
JAMES E. DAMMANN
EDWARD J. SKIKO

BY [signature]

ATTORNEY

April 26, 1966 J. E. DAMMANN ETAL 3,248,705

AUTOMATIC EDITOR

Filed June 30, 1961 4 Sheets-Sheet 3

April 26, 1966 J. E. DAMMANN ETAL 3,248,705

AUTOMATIC EDITOR

Filed June 30, 1961 4 Sheets-Sheet 4

United States Patent Office 3,248,705

Patented Apr. 26, 1966

3,248,705

AUTOMATIC EDITOR

James E. Dammann, Hyde Park, and Edward J. Skiko, Poughkeepsie, N.Y., assignors to International Business Machines Corporation, New York, N.Y., a corporation of New York Filed June 30, 1961, Ser. No. 121,027
11 Claims. (Cl. 340—172.5)

This invention relates to electronic apparatus. More particularly, this invention relates to means for editing visually displayed stored material.

Information may be preserved by printing the information on pages of paper in the form of alphabetic, numerical and special characters arranged into lines and paragraphs. This information (copy) may initially be stored on punched cards, magnetic tape, handwritten manuscript sheets, etc. In any case, it is desirable to transform (edit) the copy from the original form to a standard form acceptable for printing. Editing includes, in the case of certain types of statistical information, the changing (updating) of copy to conform to new facts before (or while) preparing the copy for printing.

Editing of a manuscript prior to the preparation of the final copy usually entails: (1) typing of a first draft, (2) deletions, insertions and corrections by an editor, and (3) retyping. In preparing the output of electronic data processing systems for printing similar editing problems arise. Leading zeroes present in arithmetic results from a computer should be eliminated to prevent confusion when printing checks or bills. Controls signals, such as "upper case shift" and "lower case shift" may be emitted by a computer along with the results. These signals should be utilized in controlling the printing operation, but should not appear in the printed copy. Special symbols such as dollar signs are often necessary to given meaning to the results supplied by a computer. A common method of doing these operations automatically in an electronic data processing system is to execute a complicated program of editing instructions which require large portions of machine time.

Typical editing operations may be described as "entry" (or "replacement"), "erasure," "deletion," "insertion," and "recomposition." Many additional or different editing operations may be performed for updating, correcting and preparing copy for pritning—these few operations serving only as illustrations. "Entry" of new characters in place of present characters is a common editing operation. This permits spelling and punctuation corrections, updating of old numerical data, etc. The new character is entered in place of the old character, destroying it. "Erasure" of one or more characters of information leaves blanks where the erased characters were. This is a useful editing operation where the spelling of a word is not known and a letter is left open for future insertion, or where an unknown street address is left open for future insertion. "Deletion" differs from "erasure" in that the erasure of a character leaves a blank whereas when one or more characters are deleted, the space left by the deletion is closed up by moving following characters to the left. If a word has too many letters it is necessary to delete the extra letters and close up the resultant space. In such cases it is desirable to retain the spacing of all subsequent copy. Thus the shifting of characters to close the blanks left by deletions should be carried to subsequent lines until the end of the paragraph in which the deletion occurred. If the paragraph does not end on the page on which the deletion was made, then the shifting of characters to the left should continue to the end of the page. If these rules are not followed, the closure required by deletion will open up blanks at the end of the line which the deletion occurs, destroying the existing unity of the copy.

"Insertion" of characters differs from "entry" of characters because "entry" results in replacement of old characters by new characters whereas "insertion" of a character causes the old character, and the following characters (to the end of the paragraph or page), to be shifted to the right in order to make room for the new character. In the cases of deletions and insertions, "recomposition" may be necessary because words will be improperly split at the ends of lines due to the shifting operations. Recomposition of copy entails recognition of those words that are split at the ends of lines and shifting of all characters to the right of the blank space preceding a split word until the split word appears as a single word on the next line.

Manual editing and program editing are solutions to the problems of updating copy or correcting copy prior to printing. However, manual editing is time-consuming while program editing is expensive, and neither manual editing nor program editing is flexible enough to give an insight into the manipulations to be performed on data in the storage portion of a data processing system.

It is therefore an object of this invention to provide automatic editing apparatus.

Another object of this invention is to provide apparatus for performing editing operations upon electronically stored copy.

Still another object of this invention is to give a number of sources access to electronically stored copy for the purpose of editing said copy.

A further object of this invention is to permit one or more operators to visually monitor electronically stored copy and to edit said copy.

A still further object of this invention is to provide a number of keyboards for affecting changes in electronically stored copy.

Still another object is to provide apparatus operative to enter new characters in place of old characters in electronically stored copy.

A further object is to provide apparatus for erasing old characters in stored blocks of information.

A still further object of this invention is to provide apparatus with deletion means for erasing characters in stored copy and automatically closing the blanks resulting from the erasure.

Still another object is to permit the insertion of characters between old characters on a page of copy with automatic adjustment of the old characters to provide room for the new characters.

Another object of this invention is to provide electronic apparatus operable to automatically recompose stored copy in order to eliminate words that have been split.

The foregoing and other objects, features and advantages of the invention will be apparent from the following more particular description of the preferred embodiment of the invention, as illustrated in the accompanying drawings.

The objects may be achieved by providing a storage unit for electronically holding the copy to be edited. The stored copy may be displayed one page at a time on the face of one or more visual-display devices, such as cathode-ray-oscilloscopes. Keyboards having keys for each character and each operation may be associated with each cathode-ray-oscilloscope (CRO) for permitting manual editing of the dipslayed copy. Provision is made on the keyboard for highlighting displayed characters by brightness, an extra spot, etc. When the character key on the keyboard is depressed it will usually affect the highlighted character only. In this way stored copy, visually represented, may be edited from one or more keyboards.

Copy is divided into pages, paragraphs, lines, words, and finally characters (including blank characters). Signals representing characters in any known codes (for example binary-coded decimal) may be stored, as states, in locations of an electronic storage device to form the copy. One code position (P-Bit) of each character is reserved for indicating whether or not the character is to be highlighted.

The copy is transferred from the storage to an output buffer (OB) one character at a time in sequence. The character is then transferred back to the same storage location from which it was read. The output buffer is monitored by a binary decoder which controls a CRO. The decoder translates each character entered in the output buffer into analog information for controlling the CRO to give a visual representation on the CRO face of the binary character in the output buffer. Subsequent characters are sequentially read into the output buffer and regenerated on the CRO face at a rate calculated to permit the display of an entire page of stored copy before any degradation of the first displayed character occurs. Thus, it is obvious that the purpose of continuously reading characters into the output buffer and writing them back into storage at the location from which they were removed, is to "regenerate" the CRO image. Reading normally occurs in the usual manner from left to right and top to bottom of the page ("forward" regeneration), though reversal ("backward" regeneration) is possible. In either case, the CRO image appears the same. When a character with a P-Bit associated with it is read into the output buffer, the decoder causes the displayed version of the character to be brighter than the other characters on the face of the CRO.

Characters may be entered from the keyboard into an input buffer (IB) by striking a desired key, which closes contacts and operates a circuit for generating appropriately coded signals representing the indicated character. Automatic gating circuits, partially controlled from the keyboard, permit the entry of characters into storage from either the input buffer or the output buffer. Another gating circuit permits transfer of characters from the output buffer to the input buffer.

If it is desired to enter a character from the keyboard to replace the highlighted character displayed on the CRO, one character key is struck causing a coded representation of the selected characters to enter the input buffer. Normal sequential reading (forward regeneration) of characters from storage into the output buffer and back into the storage location from which the character was removed continues without the interruption. The character in the input buffer remains until, during the normal forward regeneration operation of the apparatus, a character having a P-bit associated with it enters the output buffer. Recognition of a P-bit causes operation of the gates so that the character (and the associated P-bit) in the output buffer is blocked from entering storage while the character in the input buffer is entered into storage in its place. The character (but not the P-bit) in the output buffer is destroyed before the next character is read from storage. Normal forward regeneration cycles then resume, the P-bit now being associated with the next sequential character. The character requested by the keyboard replaces the original brightened character shown on the CRO face the next time that storage location is read into the output buffer. Since the P-bit is now associated with the next character, the character to the right of the newly entered character will appear as a brightened image.

Highlighting may be changed from one character to another by delaying the P-bit in the output buffer one or more regeneration cycles so that it becomes associated with a different character in the output buffer before it is entered into storage. Forward positioning (to the right) occurs during forward regeneration cycles and backward positioning (to the left) occurs during backward regeneration cycles.

A character may be erased by entering a blank character into the input buffer to be entered into storage in place of the character in the output buffer. The face of the CRO will show a blank in place of the previously brightened character. The character to the right of the blank character will now have a P-bit associated with it.

Whole blocks of characters may be deleted and the erased portion closed together by associating one P-bit with the character preceding the beginning of the record to be deleted and another "end" P-bit with the last character of the record to be deleted. The point (usually the end of the paragraph) at which compensation for the deletion is to be stopped is denoted by a special character "BD." When a delete key is struck, characters are read from storage into the output buffers backwards, that is, from the bottom of the page to the top and from the right of each line to the left in backward regeneration cycles. When the BD character is sensed in the output buffer, it is inserted in its location in storage and delay cycles begin, a blank appearing to the left of the BD character. All subsequent characters (reading from right to left) are entered into storage one position to the left from the location read due to a one-cycle delay introduced by reading the output buffer into the input buffer, from which the character is written into storage. When the P-bit associated with the character at the end of the record to be deleted is reached, this character and the P-bit in the output buffer is destroyed, the character in the input buffer is entered into storage in the destroyed character's location. Shifting stops and backward regeneration resumes, a P-bit being "forced" into association with the next character of the record to be deleted. When the BD character is again sensed, a second blank is inserted to its left and all characters between this point and the newly brightened character are shifted left, destroying the newly brightened character and movng the P-bit left to the next character. This process repeats until the "end" P-bit is shifted to the character adjacent to the other character having a P-bit. When this occurs, the last shift cycle destroys the character with the end P-bit and restores normal forward regeneration.

Characters may be inserted by pressing an "insert" key and entering the character to be inserted into the input buffer from the keyboard. The resultant adjustments end at the bottom of the page or at a point designated by a special "EOR" character. Forward regeneration continues until the character with a P-bit is read into the output buffer. The gates then operate in delay cycles, to write the character in the input buffer into storage and transfer the character in the output buffer into the input buffer. All subsequent characters are read into the output buffer, transferred into the input buffer and then written into storage. As a result, the subsequent characters are delayed one cycle, being shifted right one position to make room for the inserted characted placed into the input buffer by the keyboard. The P-bit remains associated with the same character (now shifted right) throughout the operation. A normal regeneration cycle commences when the bottom of the page is sensed or when the EOR character enters the output buffer.

Recomposition is initiated by pressing a "recompose" key on the keyboard. Normal forward regeneration cycles continue with the exception that the P-bit "runs" from character to character in a forward direction instead of remaining associated with one character. Though the last character position (EOL) at the end of each line is open to the keyboard, it is improper for information to initially be entered into this position, characters appearing there only as a result of shifting during insertion and deletion operations. When this condition occurs it is assumed that a word is improperly split (though this is not always true) and should be moved to the next line as a complete word. When a character with a P-bit (due to P-bit "running") occurs in the EOL position of any line, the normal forward regeneration cycle is replaced by reverse regeneration cycles, the character moving from the output buffer to the storage. P-bit running stops when a blank character (at the beginning of the split word) appears in the output buffer and a second blank is inserted. The gates are adjusted to start delay cycles causing every character following the inserted blank (including the original blank) to be shifted right one position from this point to the end of the page.

This operation is repeated (the P-bit again running) until no characters with P-bits occur at the end of any lines, indicating that all split words have been moved to the next line as complete words.

Within the scope of this invention are many other editing operations too numerous to describe. Further, the keyboard may be replaced by any other entry device such as card readers, etc., or the keyboard and CRO may be completely eliminated and all signals may be transmitted to and received from a computer. In the latter case, the computer editing program execution time would be appreciably reduced due to the relatively few instructions required to control complex editing operations of the automatic editor. The storage unit may be included in the automatic editor or it may be part of an associated computer. If a separate storage is provided with the automatic editor, it may initially be filled from a keyboard, etc., or from the storage of a computer (giving insight into computer manipulations).

Figures 4A, 4B:
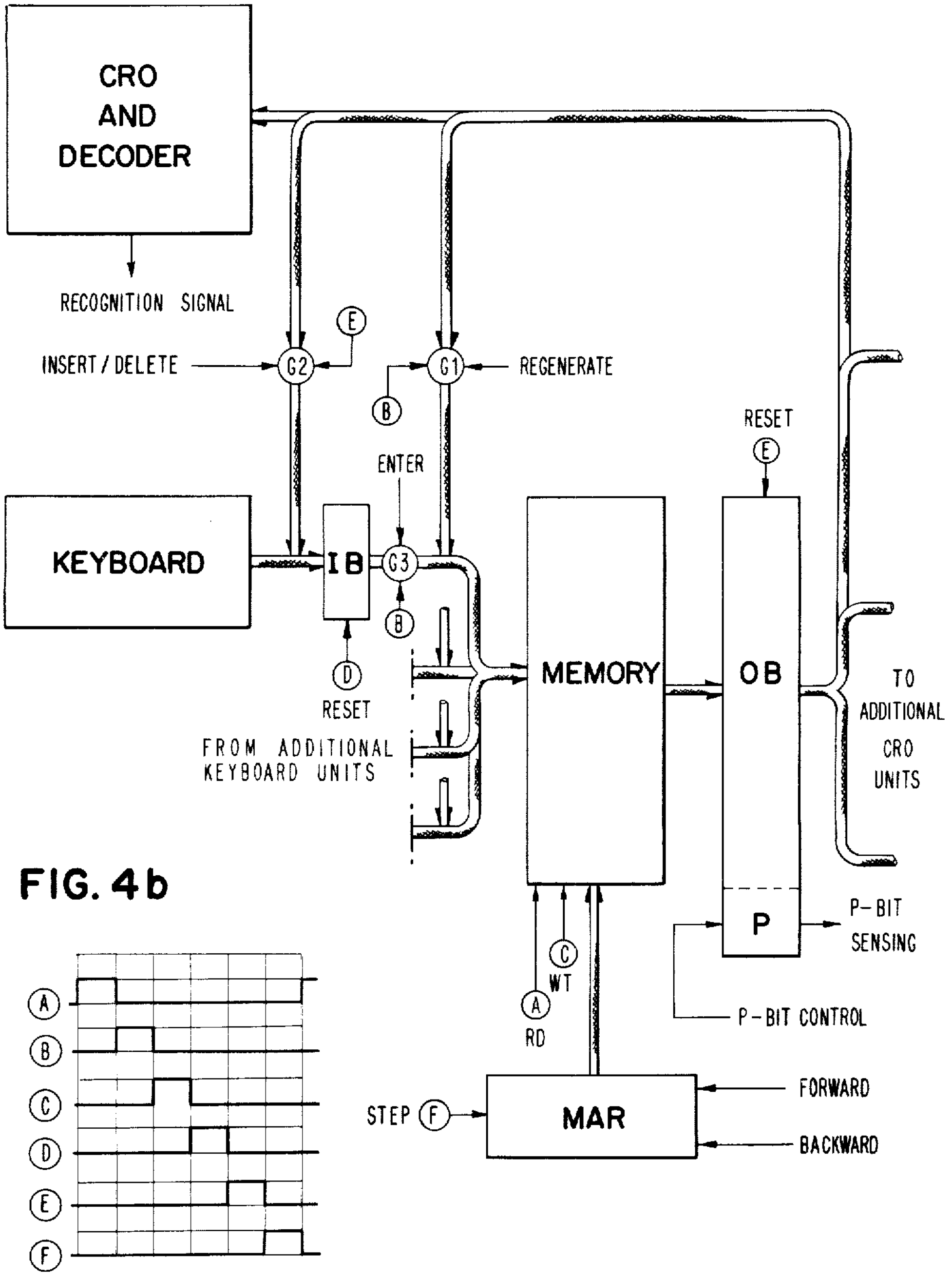

FIGURE 4*a* is a data flow diagram for an embodiment of the invention.

FIGURE 4*b* is a timing diagram of signals used to control the embodiment shown in FIGURE 4*a*.

Figure 5A:
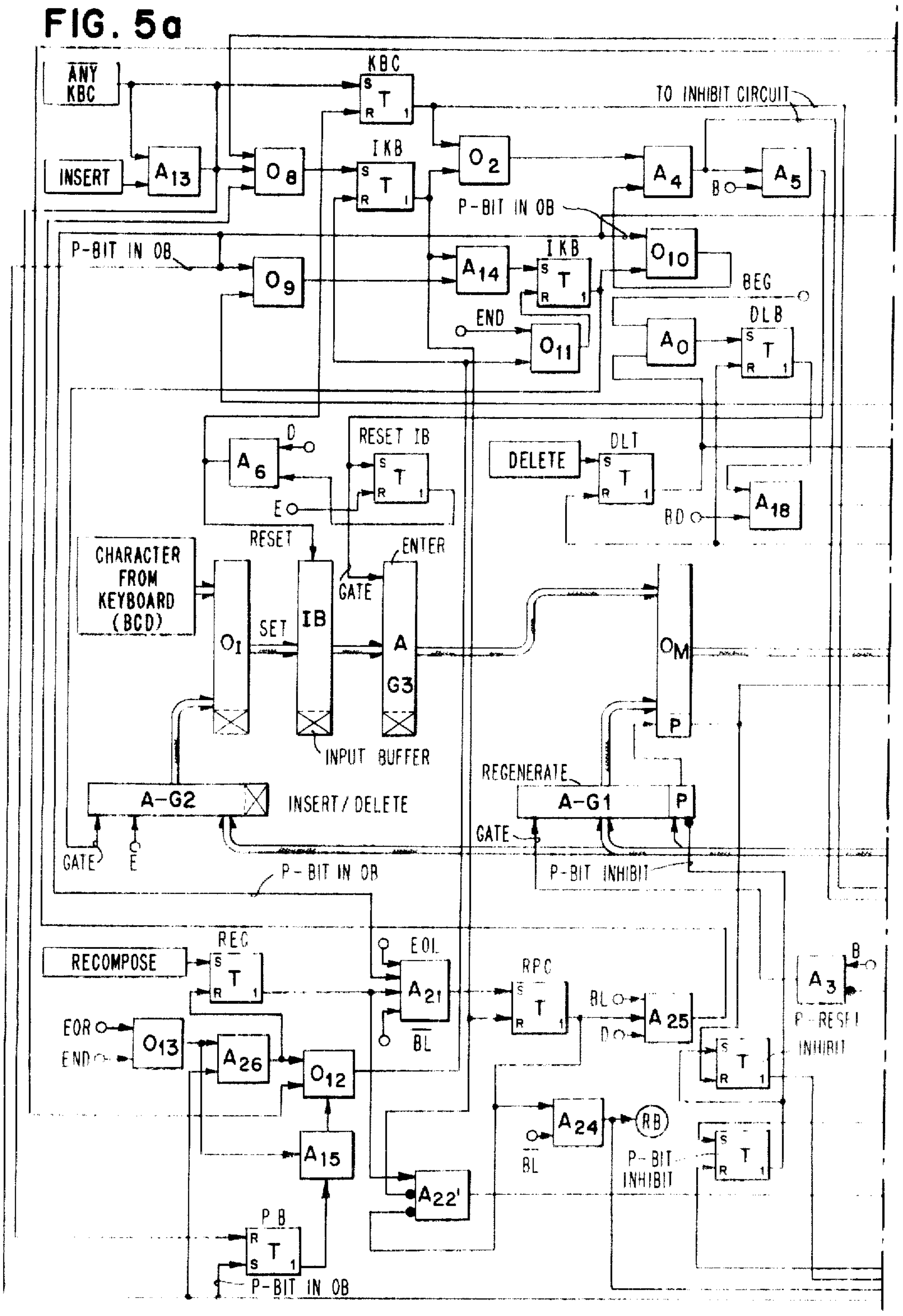
Figure 5B:
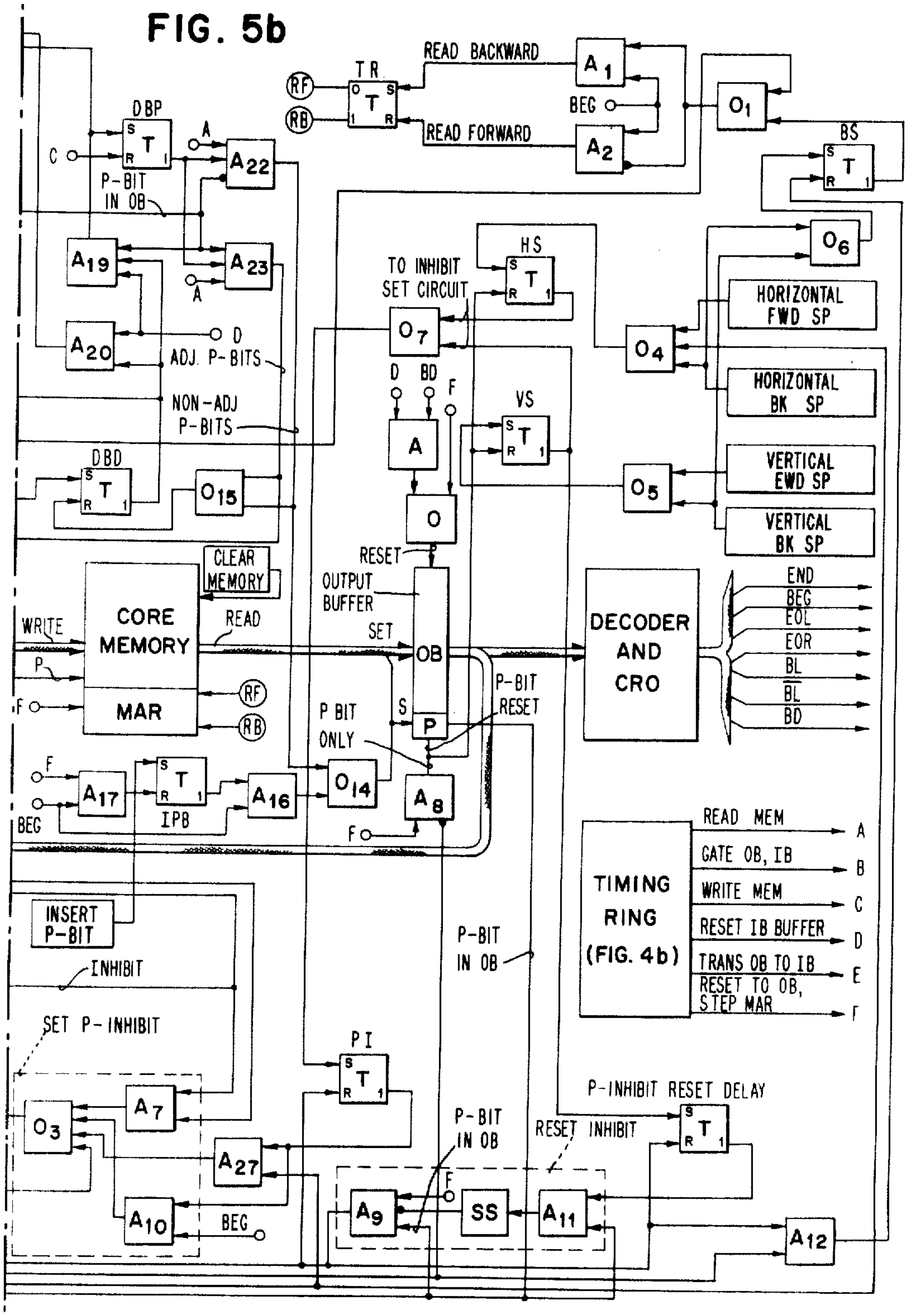

FIGURES 5*a* and 5*b* together form a logic diagram of the embodiment of the invention shown in FIGURE 4*a*.

Figure 1:
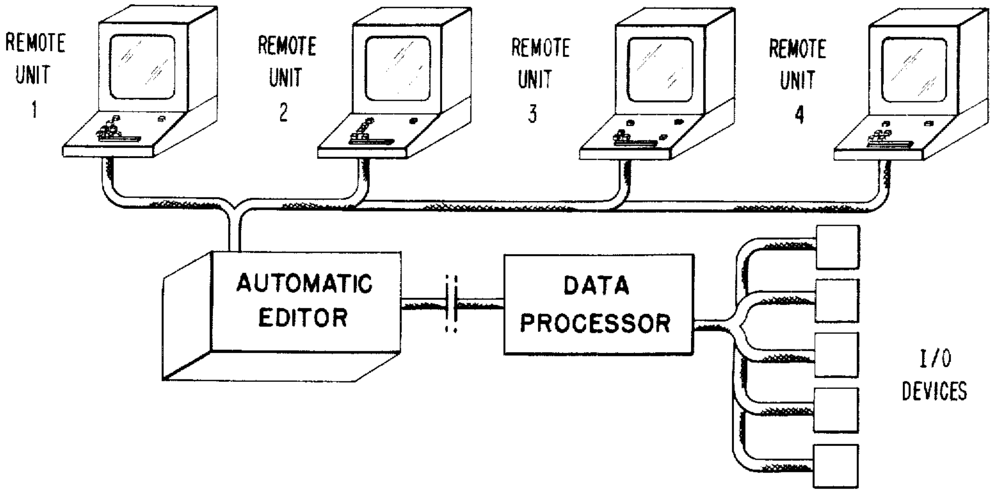
FIGURE 1 is a diagrammatical representation of a multi-unit display system embodying the invention.

Referring to FIGURE 1, there is shown a system utilizing the automatic editor which is the subject of this invention. A number of remote units are shown in conjunction with a group of I/O Devices and a data processing machine. Each remote unit contains means for visually displaying a representation of a page of copy, comprising paragraphs, lines, words and alphabetic, numerical and special characters. This representation is derived from information stored in the data processor, though it may come from any other source. Each remote unit further includes a keyboard which is shown in more detail in FIGURE 2. The keyboard is a standard typewriter keyboard with certain additional keys, to be explained in detail later, which control the operation of the automatic editor. The data processor may be any form of prior art electronic computer or it may be eliminated, as it is not necessary for the operation of the invention if some form of storage is provided in its place. If a data processor is used it usually has associated with it a group of input/output devices. These are used to enter information into the data processor and to receive information resulting from operations within the data processor. Thus, one possible use of the invention is to edit the results of operations in the data processor before it transmits the results to an input/output device for printing.

In some types of problems it is desirable for more than one person to have simultaneous access to the copy for editing. For instance, if the personnel records of a business are electronically stored, time-keeping personnel must have access in order to enter the hours worked during a pay period by employees while the accounting department must be able to change the hourly wages of employees who have been promoted during the last pay period. In addition, the normal editing functions (deletion of leading zeroes, insertion of new employees, spelling corrections, etc.) on the results of computations in the data processor may be performed at a third location. The automatic editor permits all of these functions to be performed, each operator being given access to the stored copy by a separate, conveniently located, CRO and keyboard unit.

GENERAL DESCRIPTION

Figure 2:
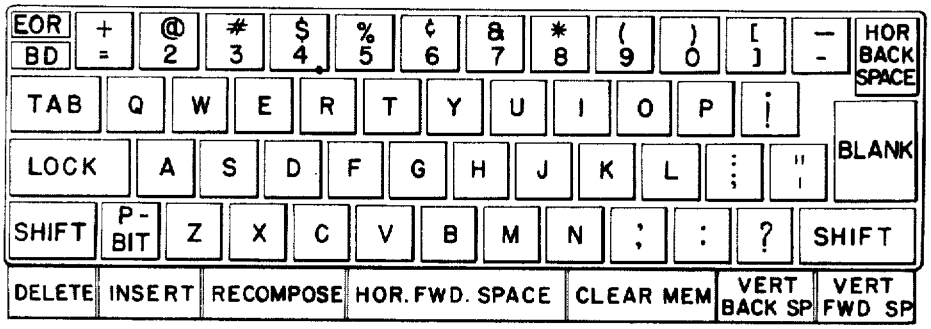
FIGURE 2 is an illustration of a keyboard usable with the invention.
Figure 3:
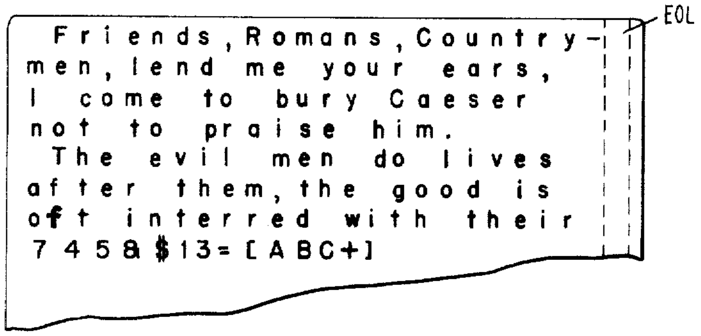
FIGURE 3 is an illustration of an image on the face of a visual display usable with the invention.

A typical keyboard is illustrated in FIGURE 2, and an illustrative visual display on a CRO face is shown in FIGURE 3. Characters are entered from the keyboard simply by striking the keys in the manner that they are struck to type information onto a piece of paper in a standard typewriter. The copy shown in FIGURE 3 is entered by striking the horizontal forward space key, the shift and "*f*" keys, the "*r*" key, etc. The striking of a key results in the entry of the specified character at a point in the stored copy indicated by a bright spot on the CRO display. In FIGURE 3, this bright spot is in the middle of the word "oft" in the next to the last line. Initially the bright spot is positioned in the first character place of the first line by striking the P-bit key. Initially there was a blank character in this position, any arbitrary symbol may represent a blank for brightening purposes. When the horizontal forward space key is struck the bright spot is moved to the second position of the first line, leaving the original character (a blank character) in the first position. Next, the shift key is struck and held and the "*f*" key is struck, causing "F" to be entered in the second space of the first line. The bright spot automatically moves to the third position of the first line. The letter "*r*" is struck next, a lower case "*r*" being entered in the third position of the first line as a result, and the bright spot being moved to the fourth position. After the entry of the last character on the first line (—) the bright spot will move to the last (EOL) position of the first line. The operator must strike the horizontal forward space key to move to the first position of the second line, at which time the next character "*m*" may be entered. The EOL position at the end of each line is indicated in FIGURE 3 by dashed lines. In the normal operation of the automatic editor this extra column is not used by the operator for the entry of characters, though the bright spot moves to the first position of the next line from the EOL position. The last line of the illustration of FIGURE 3 shows the various types of numbers and special characters that may be entered from the keyboard by combinations of the shift and special character keys in the same manner that such characters are entered from the keyboard of a standard typewriter. In each case the key-indicated character is entered in a position of the stored copy indicated by a bright spot on the CRO face. The bright spot then advances to the next character position. Thus, characters are entered sequentially from the keyboard.

If it is desired to enter characters from the keyboard in non-sequential positions, it is necessary to control positioning of the P-bit in other than an automatic sequential manner. The horizontal forward space key of FIGURE 2 permits the bright spot to be advanced to the right one space. Therefore, in FIGURE 3 it is possible to indent the first character (F) one space by striking the horizontal forward space key prior to striking the "*f*" and shift keys. The bright spot may be moved backward (to the left) one space by striking the horizontal back space key. In this way the operator may return the bright spot to a previous position at will. For instance, if the operator has advanced the bright spot too far he may strike the horizontal back-space key the correct number of times to compensate for his error. The vertical forward-space key permits the bright spot to be moved forward one line vertically without the necessity of numerous single forward spaces on each line. For instance, if the bright spot is located as shown in FIGURE 3, in the middle of the word "oft," striking the vertical forward-space key results in the positioning of the bright spot in the second position of the last line (character 4). Similarly, the vertical back-space key is used to move the bright spot backward up the page one line in the same column. Therefore, if the number 4 is brightened striking the vertical back-space key returns the bright spot to the character "*f*," illustrated in FIGURE 3.

By use of the key labeled "blank" a stored character appearing as a brightened character on the CRO face may be erased. For instance, if the character "*f*" in the next to the last line of FIGURE 3 is brightened as shown and the key "blank" is struck, the "*f*" will be replaced by a blank spot so that the word will now appear "o t". The next character (*t*) will be brightened. If the original character in the first position of the first line had not been a blank, it would have been necessary to enter a blank instead of merely shifting the bright spot right one position as previously described. The blank key permits whole words to be erased and permits corrections to be made at the will of the operator.

Whereas the erasure of a character or characters may be desired in order to make a correction, it is often more desirable to erase characters or words without leaving a blank space. For example, it may be that the word "oft" in the next to the last line of the illustration of FIGURE 3 should not have been written. If the previously described "blank" key is used to remove the word "oft," there will be a blank spot left indicating where a removal has been made. The delete key is used to initiate a delete operation wherein a designated area is erased and the resultant blanks are closed by shifting the following copy a compensating number of positions to the left. For example, in FIGURE 3, if the word "oft" is deleted, the balance of the paragraph following the word is moved left to close the space left by the erasure of the word "oft." Blanks may be treated as ordinary characters in shifting, or they may be specially treated during inter-line transfers so that when a word is shifted up to the next higher line no more than one blank separates it from the adjacent lefthand word. Prior to pressing the delete key, the bright spot shown as occurring in the second position of the next to the last line must be moved to the end of the paragraph to be adjusted. The purpose of delineating the end of the paragraph to be adjusted is that closure upon the space left by deletion of "oft" will affect the copy following the deleted word. The shifting is normally carried to the end of the paragraph in which the deletion occurs. However, if the paragraph continues past the end of the visually displayed stored page, it may be necessary to carry the correction further. In special cases, it may be desired to correct only a portion of the paragraph in which the deletion occurs. In all cases, the BD character is entered at the point where compensatory shifting is to end. The bright spot is moved to the proper point (the end of the paragraph in FIGURE 3 for illustration) by striking the vertical forward-space key once, moving the bright spot to the second position of the last line, and then striking the horizontal forward-space key thirteen times to bring the bright spot to the space following the parenthesis of the last line. The BD key is then struck, causing the special character BD to be entered at the end of the paragraph. The bright spot is then returned to the end of the record to be deleted (character "*t*" of the word "oft") by striking the horizontal back-space key twelve times and the vertical back-space key once. This bright spot thus delineates one limit of the record to be deleted. Next, the P-bit key is struck causing a second bright spot to appear at the top lefthand corner of the page on the face of the CRO in FIGURE 3. This second bright spot is moved to the character (blank in EOL position in the previous line) preceding the beginning of the record to be deleted (the character "*o*" of the word "oft") by striking the vertical forward-space key five times, and the horizontal forward-space key twenty-four times. The record to be deleted (oft) is now delineated by two bright spots, one preceding the record and one at the end of the record, and the point at which compensatory shifts (needed in order to close upon the deleted area) are to end, is indicated by the special character BD. Next, the delete key is struck. At the end of the deletion operation the word "interred" will start at the lefthand column of the page and all following characters will maintain their spacing so that the paragraph will end further to the left of the last line than shown in FIGURE 3, part of the last line now appearing at the end of the next to the last line. The BD character, being to the right of the point at which left shifting starts, remains in its original position. In this way the word "oft" has been erased and the subsequent information has been closed upon the blank left by the erasure.

The insert key permits additional information to be entered between characters in the copy displayed on the CRO, adjustments automatically being made to supply the extra space required. For instance, if in entering characters from the keyboard a character was erroneously omitted, it may later be supplied. Indentations, word spacings and punctuation may be supplied by using the insert ability of the automatic editor. By striking the insert key and then striking a character key, the character specified by the key struck is entered in the position of the brightened character on the screen, all other characters being moved one position to the right to supply the extra space. The originally brightened character remains brightened though shifted one position. Thus, in FIGURE 3, the character "*f*" of the word "oft" is initially brightened. When the insert key labeled "insert" is struck, and then the key "*x*" is struck, an "*x*" will be entered in the position of the character "*f*" of the word "oft," and the letter "*f*" will appear as a brightened character in the third position of this line. The character "*t*" that originally was in the third position of this line will now appear in the fourth position, and so on, all additional characters in the seventh line (and all following lines) being moved to the right one position. The character "*r*" of the last word (their) will abut the dashed line shown in FIGURE 3. Additional adjustment will occur in the last line if all the blanks are shifted. If only the last blank is shifted no adjustment carries over into the last line. In the latter case, if an additional insertion is made in the same line, the letter "*r*" of the word "their" will fall within the dashed lines. Since enough space still remains in the next to the last line no adjustment will be made in the last line. If a third insertion is made in the next to the last line, there will be no room for the letter "*r*" of the word "their" so that it must be placed in the beginning of the last line, splitting the word "their." If thus occurs, the last line will begin with a character "*r*" followed by the character 745, etc., all moved over one space. These adjustments will continue in a chain until the end of the page is reached, unless the special character EOR is inserted (before the insert key is struck) in the manner of the BD character described previously with respect to the delete operation.

Deletion and insertion operations may result in the improper splitting of a word at the end of a line. This occurs in deletion due to the automatic closing of material following the deleted area which shifts characters from the next line up into the end of the line in which deletion occurs, and this occurs in insertion due to the automatic opening of an extra space and the adjustment of all the following copy to supply the space. The automatic editor permits automatic recomposition of material displayed in the face of the CRO in FIGURE 3 to eliminate all word splitting. Since, initially it is improper to enter characters from the keyboard into the last column (EOL) shown in FIGURE 3, the material is assumed properly composed, without improper word splitting, as long as no characters appear in the last column. The recomposition feature of the automatic editor is not operative unless a character appears in the EOL position. If a character (other than a blank) enters the last EOL column, it is assumed that the word to which it belongs is improperly split and that the entire word must be moved to the beginning of the next line. For instance, if due to insertion operations in the next to the last line of FIGURE 3, the character "*r*" of the word "their" enters the dashed column, it is assumed that the word "their" is improperly split (even though it is not split). Striking the recompose key causes the bright spot to move along the page left to right, top to bottom. When a character in an EOL position is detected, the bright spot stops "running" until the blank preceding the split word (their) is detected. An additional blank is inserted to the right of this blank and the entire word and all subsequent copy is shifted right one space. These steps repeat continuously (the P-bit again running) until no non-blank characters appear in the EOL positions. As a result, the entire word "their" is moved to the beginning of the next line. The information in the last line 745, etc., being moved to the right to make room for this word. If, as a result, additional characters from the last line had been entered in the EOL position, they would have been moved in a similar manner to the next line. Blanks may be moved from line to line as they pass the EOL position, or the apparatus may be designed to move only the last blank to the right of a word to the next line, destroying all other preceding blanks.

DESCRIPTION

*FIGURES 4a and 4b*

Referring now to FIGURE 4*a*, one embodiment of the invention is illustrated. The memory is any standard electronic memory, movable or otherwise, which may store signals as states. For the purposes of this invention it is only necessary that the memory configuration be such that signals representative of pages of copy can be stored as states at locations available to the associated apparatus. The memory may store signals representative of many pages of copy, or other types of information, in addressable locations (each location holding one character, for purposes of illustration only). Access to memory, meaning the generation of signals corresponding to the states of certain indicated locations in memory, is obtained by means of a memory address register (MAR). The signals stored in the MAR at any one time identify the locations of one character in memory. Therefore, access to all copy stored in the memory may be obtained one character at a time, by changing the contents of the MAR. The MAR contents are changed from the address of one character to the address of an adjacent character by placing a signal on the step line F. The forward line and the backward line are used to specify the direction of change. If the location of a particular character in memory is identified by the contents of the MAR, a signal on the lines forward and step causes the next sequential character located to the right to be identified and a signal on the lines backward and step causes the previous sequential character to the left to be identified. Normally signals on the forward and backward lines are applied only when it is necessary to change the direction of count. The MAR may be eliminated entirely if a type of memory which makes all its contents available spontaneously is substituted.

Referring to FIGURE 4*b*, a timing diagram of pulses used to control operations in the apparatus of FIGURE 4*a* is shown. Pulses A through F occur in sequence. Each complete sequence from A-time through F-time is called a "character cycle." As will be explained below with reference to each part of the apparatus of FIGURE 4*a*, one character is routed through the automatic editor during each "character cycle."

Referring again to FIGURE 4*a*, the memory is arranged in a manner well known in the art to store characters (comprising groups of bit representative signals) in the form of groups of signal representative states. Any number of bits may represent a character, the actual number being irrelevant except that one extra bit (P-bit) should be provided for indicating whether a character is, or is not, to be brightened. Thus every character in the memory is represented by a number of bits plus an additional P-bit. Memory is read from at A-time and it is written into at C-time.

The character at the location specified by the MAR is read from memory into an output buffer OB made up of two parts, one part for receiving the character representative bits and the other part for receiving the additional P-bit associated with that character. The OB is reset at F-time. The P-bit part of the output buffer OB is filled by memory along with the balance of the output buffer OB if there is a P-bit associated with the character. Signals on the P-bit control line permit the P-bit to be retained in the OB, though the rest of it is reset, and also permit a P-bit to be forced into the OB. The presence of a P-bit is sensed by a signal on the P-bit sensing line.

An input buffer IB is provided for receiving and holding bits identifying a character to be entered into the memory at a location specified by the memory address register MAR. The IB is reset at D-time.

The output buffer OB is connected to the memory via a regenerate gate G1, which permits information to be entered into memory from the output buffer OB at B-time if there is a regenerate signal. This gate is the only one used during normal regeneration cycles.

The output of the output buffer OB is connected to the input of the input buffer IB by means of an insert/delete gate G2 which permits the contents of the output buffer OB to be transferred to the input buffer IB when the gate G2 is operated at E-time if there is an insert or delete signal. The input buffer IB is connected to the memory by an enter signal. The gates G2 and G3 are used during delay cycles.

Characters may be entered into the input buffer IB from an entry device which may be any standard typewriter keyboard arranged as shown in FIGURE 2, or the entry device may be a card reader, a magnetic tape unit, a paper tape reader, etc. The only requirement is that the entry device supply signals representative of character-coded bits which may be stored in the input buffer IB. More than one keyboard may have access to the memory via additional input buffers, each connected in parallel to the cable entering the memory. Thus, a number of keyboards may enter information into a number of input buffers, each input buffer being able to supply information to the same memory. Each of the additional input buffers receives characters from memory and from the output buffer OB via additional cables and gates for each input buffer. The input buffer IB shown has provisions only for bits representing a character, and not for the additional P-bit. Therefore, the insert/delete gate G2 does not have provision for a P-bit either, but the regenerate gate G1 does. Obviously, this arrangement is a matter of choice.

The contents of the output buffer OB are continuously monitored by a visual display (CRO) and an associated decoder. The CRO and decoder function to translate the binary information contained in the output buffer OB into analog display information on the face of the CRO. For instance, if the bit configuration in the output buffer OB corresponds to the capital letter "C," the Roman letter "C" will appear on the face of the CRO, in a position corresponding to the position of the character bit configuration. The decoder circuitry also acts to recognize certain bit configurations in the output buffer OB identified on the recognitional signal line. For instance, if the particular bit configuration assigned to the "blank" character (no one bit) occurs in the output buffer OB, the decoder will recognize this character and emit a recognition signal. Additional CRO and decoders may be connected to the output buffer OB outputs in order to duplicate the display.

The CRO and decoder (excluding the recognition circuitry) are the subject of patent application Serial No.

90,678, filed February 21, 1961, by E. J. Skiko et al., entitled "Display System and Associated Method" and assigned to the International Business Machines Corporation. It is intended that the apparatus disclosed in the Skiko et al., application be incorporated into this specification by this reference.

Referring again to FIGURE 4*b*, the functions of the control clock output pulses will be summarized. The control sequence is as follows: (A) At A-time the contents of memory at the location indicated by the memory address register MAR, are read into the output buffer OB; (B) at B-time the character read into the output buffer OB, or the contents of the input buffer IB, if any, may be gated to the memory; (C) at C-time the characters gated to the memory are written into memory at the location indicated by the memory address register MAR; (D) at D-time the input buffer IB is reset; (E) at E-time the contents of the output buffer OB may be transferred to the input buffer IB; and (F) at F-time the output buffer OB is reset and the memory address register MAR is stepped to the next sequential address.

OPERATION

*Figures 4a and 4b*

Still referring to FIGURE 4*a*, there are two basic operations which may be performed by controlling the gates G1, G2 and G3. Each operation extends over one character cycle from A-time to F-time and may be repeated during the next cycle. The first basic operation is the regeneration cycle which occurs when gate G1 is selected by a signal on the line regenerate and the gates G2 and G3 are not selected. With gate G1 alone selected, characters are read from memory into the output buffer OB at A-time, transferred to memory via G1 at B-time and written into memory at C-time. The character is read from memory at a location selected by the memory address register MAR. The character is written into memory at the same address since MAR is not stepped to a new location until the end of the regenerate cycle at F-time. In this way during a series of regenerate cycles every character contained in memory is read from memory in sequence, placed into the output buffer OB and then written into memory at the same address from which it was removed. The CRO face displays each character as it is read from the memory into the output buffer. The persistence of the luminous material on the face of the CRO is sufficient to retain each character for a period longer than that necessary to bring each character of a page in memory into the output buffer OB once. Thus all characters on one page may be displayed on the face simultaneously though each character of the CRO on the page is read sequentially. The character having a P-bit associated with it will when read into the output buffer cause a signal to appear on the P-bit sensing line which will result in a bright spot at the point on the screen where the character is located.

If gate G1 is disabled at the beginning of a regenerate cycle, the character in OB will not be sent to memory at B-time. If gate G3 is enabled prior to B-time the character in IB will be written into memory at C-time at the location from which the character in OB was read. If IB is empty a blank will appear on the CRO face at the point where the character in OB was located, since the code for a blank character is an absence of one bit. Thus a character may be erased by blocking gate G1 during regenerate. If a character was entered into IB from the keyboard, this character replaces the character in OB on the CRO face. Thus, entry of characters from the keyboard is possible by blocking gate G1 and enabling gate G3 during regenerate.

The second basic operation, the delay or character shift cycle, is performed by disabling the gate G1 (removing the signal on the regenerate line) and enabling gates G2 and G3 by signals on the insert/delete line and enter line. Character shifting to the right is necessary during insertion and recomposition, and character shifting to the left is necessary during deletion. The direction of MAR stepping determines the direction of character shift. One character during each delay cycle is read into the output buffer OB at A-time from a location specified by MAR. At B-time the character in IB is gated to memory via gate G3, and is written into memory at C-time at this same location, replacing the character read into OB. The character in the output buffer OB is placed into the input buffer IB at E-time via gate G2, and thus enters memory after MAR is stepped at F-time at a location adjacent to the one from which it was taken. In summary, during delay cycles each character is written from IB into memory at a location adjacent to the location from which it was read into OB. The writing of a character occurs in the character cycle following the cycle in which it was read. This one cycle delay appears on the CRO face as a character shift. If MAR is stepped backward at F-time the character will appear in the position to the left of its original position. If MAR is stepped forward at F-time the character will appear in the position to the right of its original position. Each delay cycle causes one character position shift.

It is obvious that during the first delay cycle, any character present in the input buffer IB will enter the memory at the location from which the character presently in the output buffer was read. If IB is empty, a blank will appear on the CRO face at the point where shifting begins, the code for a blank character being no one bit. IB may be set to any character desired from the keyboard, permitting the insertion of the specified character in the space left at the point where shifting begins. Thus, at the beginning of a delay cycle, characters (including blanks) may be inserted in a position, and all characters including the one originally in that position shifted one way or the other.

It is also obvious that during the last delay cycle of a series of delay cycles, a character is lost since it will be read into OB at an A-time but will not be sent to memory during the next B-time. This appears on the CRO face as an erasure caused by closure from the direction of shift. Thus, at the end of a series of delay cycles, deletion may be accomplished.

Operation of the embodiment of the invention shown in FIGURE 4*a* will now be explained with reference to Tables I through VI.

TABLE I

| Character Entry from Keyboard | |
|---|---|
| Before | After |
| p<br>Friends, Rom | p<br>Happy is Rom |

Table I illustrates the entry of information from the keyboard. Only the beginning of the first line of information stored in memory and appearing on the face of the CRO is shown. The P-bit is associated with a character (F) of the first line. The keys on the keyboard are struck to spell out: "Happy is." As shown in Table I "Before," the CRO will display the material in memory with the character having the P-bit associated with it brightened. When a letter (H) on the keyboard is struck, signals representative of this character (H) are entered into the input buffer IB. The apparatus goes through successive forward regenerate cycles, the memory address register MAR being stepped forward at every F-time. When the first character (F) of the word "Friends" in the first line of the material enters the output buffer OB at A-time, a signal will emerge on the P-bit sensing line, the character F having a P-bit associated with it. Gate G1 is inactivated by the removal of a signal normally present on the regenerate line during regenerate cycles, when the P-bit is sensed. Gate G3 is operated by a signal on the line enter, the character (H) in the input buffer IB being sent to memory at B-time in place of the character F, which is blocked from entering memory. The input buffer IB is reset at D-time. The P-bit remains in the output buffer OB, though the character (F) representative bits are destroyed at F-time by a signal on the reset input. MAR is stepped forward at F-time, the regenerate input gate G1 is enabled and the enter input to gate G3 is disabled. At A-time of the next cycle, a normal regeneration cycle, the next character (*r*) in memory is entered into the output buffer OB. This character and the P-bit in the OB from the last cycle are read together into memory via the gate G1. The P-bit is now associated with the second character (*r*) of the word "Friends." Recognition of the P-bit during subsequent regenerate cycles will not have any effect until a new character is entered into the input buffer IB from the keyboard. Every character read into OB is written into memory via G1 at the same locations from which it was read. When the next character (*a*) from the keyboard is entered into the input buffer IB, regeneration cycles continue until the letter "*r*" of the word "Friends" having the P-bit associated with it is recognized in the output buffer OB. When this occurs the letter (*a*) in the input buffer IB replaces the character (*r*) as previously described. The P-bit will now be associated with the next sequential character (i). Regeneration of the characters "Haiends," etc. now continues until the next character (*p*) is entered from the keyboard into the input buffer IB. The letter "*p*" will replace the letter "*i*" and the P-bit will then become associated with the letter "*e*." Referring to Table I "After," these operations continue until the underlined portion of the characters "Happy is" are entered from the keyboard to replace the old characters "Friends." Each time a character from the keyboard replaces a letter in memory, the replaced letter is lost and the P-bit originally associated with that letter is associated with the next sequential letter.

TABLE II

| Positioning of the P-bit | |
|---|---|
| Before | After |
| p<br>Friends, Ro<br><br>men lend me | <br>Friends, Ro<br>p<br>men lend me |

Table II illustrates the positioning of the P-bit, both vertically and horizontally, in a fragment of the copy shown more completely in FIGURE 3. The initial position of the P-bit, as shown "Before," is associated with the "F" of "Friends," and as shown "After" is associated with the character "*e*" of the word "lend" in the second line. This positioning is accomplished during normal regeneration cycles by controlling the P-bits in output buffer OB. The P-bit is moved one character forward by permitting the memory address register MAR to be stepped forward (a signal initially on the forward line) while the P-bit is held in the output buffer OB long enough to become associated with the next character to the right. Similarly, the P-bit can be moved backward by initially applying a signal to the backward input of the memory address register MAR so that the F-time step signal to the MAR causes the next character to the left to be selected.

Normal regeneration cycles occur, a character being read from memory each A-time at the address indicated by the memory address register MAR. The character (F) having the P-bit associated with it will be stored in OB, the P-bit being separately stored in the output buffer OB. The presence of a P-bit in the OB is indicated by a signal on the P-bit sensing line. If a shift of the position of the P-bit was previously requested, then there will be a signal on the P-bit control line as a result of the coincidence of the request and the P-bit sensing signal. During B-time, due to the P-bit control signal, only the character bits of the character (F) stored in the output buffer OB will be made available to memory (via gate G1) for writing at C-time, the P-bit being retained in the output buffer OB. At F-time the output buffer OB is reset, but the P-bit is retained. If a right shift of the P-bit was requested the memory address register MAR forward input line had a signal initially applied to it. As a result, at F-time, the memory address register MAR will step to the character (*r*) located to the right of the character (F) just read. During the next A-time this next character (*r*) is entered into the output buffer OB. During B-time this character (*r*), along with the P-bit left over from the previous character (F), is sent to memory via gate G1. At F-time OB (including the P-bit) is reset. In this way the P-bit has been shifted one position to the right. If it had been desired to shift the P-bit to the left, the MAR backward input line would initially have had a signal applied to it, so that at F-time the MAR would have indicated the address of a character (blank) to the left of the previous character (F). Then the P-bit (blank) would have at B-time been moved along with this lefthand character to memory.

Still referring to Table II, the regeneration cycles continue, assuming that there was initially a signal on the forward line to the memory address register MAR, the P-bit moving one position to the right for each request. At every A-time a character is read into the output buffer OB. P-bits are sensed by signals on the P-bit sensing line, the P-bit control line having a signal placed on it to hold P-bits in the output buffer OB, if a positioning request was made before a P-bit is sensed. At B-time the character in the OB is transferred via the gate G1 to the memory, for writing into memory at C-time. At F-time the output buffer OB is reset but the P-bit (if any) remains, the next sequential character being read into the output buffer OB during the following A-time. At B-time the new character and the old P-bit are together transferred to the memory, via the gate G1, for writing into the memory at C-time. At F-time the new character including the old P-bit in the output buffer OB are reset, and the MAR is stepped to the location of the next character. The bright spot on the CRO face thus appears to move one position. Regeneration cycles then occur until the operator indicates that the P-bit is again to be moved by one position. In this way the P-bit may be moved character by character to the end of the line and then sequentially to the beginning of the line (the next sequential address in the MAR) as shown in Table II "After."

It is possible to provide means for moving the P-bit any number of places upon one manual command. For instance, it is possible to move the P-bit vertically by specifying that a P-bit "vertical" positioning command will move the P-bit one position each character cycle until a fixed number of cycles have occurred, the number being equal to the number of characters in a line, plus one. Thus, during A-time, when the character "F" is brought out into the output buffer OB with a P-bit, the P-bit control would retain the P-bit in the output buffer OB for twenty-six forward regeneration cycles, there being twenty-five positions (including blanks) in each line of the complete copy, shown as a fragment in Table II. Twenty-six regeneration cycles later the character "*e*" of the word "men" in the same column as the character "F" of the word "Friends" will be in the output buffer OB. A signal on the P-bit control line has caused the P-bit to be retained in the OB, though each preceding character in the OB has been written into memory as in normal regenerate cycles. Since it has been arbitrarily assumed that the number of regenerate cycles during which the P-bit is retained is equal to the number of characters in a line plus one, during the twenty-sixth regeneration cycle after the sensing of the P-bit, the P-bit will be sent to memory via gate G1 along with the character (*e*) directly below the character (F) with which it was originally associated. Thus, in Table II "After" the P-bit will now be associated with a character on a line vertically below the original character with which it was originally associated. In this way the bright spot on the CRO is moved vertically forward one line.

Vertical positioning backward is possible by initially placing a signal on the MAR backward input line instead of the forward input line. The P-bit can be made to "run" forward or backward, horizontally or vertically, by applying a series of signals to one of the positioning controls at regular intervals. The P-bit can be "cleared" by blocking it from leaving the OB and permitting it to be reset at F-time along with the character in the OB. More than one P-bit may be associated with a page of copy by conditioning each positioning operation on the detection of one MAR setting. Thus, for example, only the P-bit nearest the top of the page may be positioned, etc.

TABLE III

| Erasure of Character | |
|---|---|
| Before | After |
| p<br>Friends, Rom | p<br>Fri_nds, Rom |

Table III illustrates the erasure of a brightened character by the entry of a blank character. This operation is identical to character entry from the keyboard described with reference to Table I, with the limitation that the character entered is a blank character. Referring to Table III "Before," a P-bit is associated with the letter "*e*" of the word "Friends," causing it to be brightened on the CRO face. A blank character is entered by the operator from the keyboard into the input buffer IB. The characters "F," "*r*" and "*i*" are read from memory at A-times during normal forward regenerate cycles, from locations specified by the MAR, into the output buffer OB and then are transferred to the memory via the gate G1 at B-time for writing at C-time. When the character "*e*" is entered into the output buffer OB, the P-bit is sensed, a signal being emitted on the P-bit sensing line. Since this signal coincides with the entry of a character (blank) into the IB, the gate G1 is disabled and the gate G3 is enabled as previously described. At B-time, the character (blank) in the input buffer IB is entered into the memory via the gate G3 and at C-time this character is written into memory in place of the character (*e*) read into the OB. The input buffer IB is reset at D-time. The character (*e*) in the output buffer OB is destroyed at F-time, but the P-bit is retained in the OB by means of a signal on the P-bit control line. During the next normal forward regenerate cycle the character (*n*) is read into the output buffer OB at A-time and at B- time is transferred via gate G1 to the memory along with the P-bit, where it is written at C-time. At F-time the character (*n*) and the P-bit in the output buffer are destroyed. Thus the character (*e*) originally identified by the P-bit is replaced by a blank and the P-bit is moved to the next character (*n*).

TABLE IV

| Deletion and Closure | |
|---|---|
| Before | After |
| p p<br>praise him.BD | p<br>pse him. BD |

Table IV illustrates the deletion of a number of characters, and the closure of subsequent material upon the space left by the erasure. In Table IV "Before" the underlined letters "rai" of the word "praise" are to be deleted. The letters from the point of deletion to the point indicated by a special character BD (usually the end of the paragraph) are to be moved to the left three spaces to close the area left by the erasure of three characters. As is shown in Table IV "Before," the end of the paragraph is specified by a special character BD, the end of the record to be deleted is indicated by a first P-bit associated with the last character (*i*) to be deleted and the beginning of the record to be deleted is indicated by a second P-bit associated with the character (*p*) preceding the first character (*r*) to be deleted.

Certain preparatory steps must be taken before the deletion and closure operation. The first step is to insert the special character BD to indicate the end of the record containing the material to be deleted. This is normally at the end of the paragraph in which the deletion occurs, though it may be anywhere. Since initially any one of the characters on the face of the CRO may be brightened (indicating the association of the "first" P-bit with that particular character), the first P-bit must be moved to the blank space at the end of the paragraph for the writing of the special character BD. The first P-bit is positioned as previously explained with reference to Table II. When the first P-bit is properly positioned, the special character BD key is pressed, causing the special character BD to be entered into the input buffer IB for placement into memory in place of the character (blank) with which the first P-bit was associated. The special character BD is entered in the manner previously described with reference to Table I. Next the first P-bit is again moved as previously described, this time into association with the end of the record to be deleted, as shown in Table IV "Before." Next, it is necessary to insert a second P-bit which must be associated with the character (*p*) preceding the first character (*r*) of the record to be deleted. One method of entering a second P-bit is to recognize the location (when specified by the MAR) corresponding to the first position of the first line of the page. When the keyboard P-bit key is pressed, the P-bit control line enters a second P-bit into the output buffer OB when this first position address is recognized. The first P-bit is unaffected by this operation. Positioning of the second P-bit proceeds in the same manner as indicated with reference to Table II, the positioning operations affecting only the P-bit (second) closest to the top of the page. The first P-bit is thus associated with the character "*i*" of the word "praise" and the second P-bit is moved into association with the character "*p*" of the word "praise." The CRO face now displays two bright spots.

The delete and closure operation is initiated by pressing the delete key signaling the MAR on the backward line, causing the characters to be read from bottom to top, right to left. Normal backward regeneration cycles are executed, characters being read from memory into OB at A-time and into memory via gate G1 at B-time for writing at the location from which read, at C-time. When the special character BD is recognized in OB at A-time by the decoder, a signal is emitted on the recognition signal line, causing a series of delay cycles to ensue at D-time. At B-time the OB character (BD) is sent to memory for writing at C-time. At D-time a special signal to OB destroys its contents (BD) and the regenerate input to gate G1 is removed, disabling gate G1, gates G2 and G3 being enabled. At the next A-time the first character (.) following the special character BD is read out the output buffer OB. At B-time the contents (blank) of the input buffer IB are sent to the memory in the place of the character (.) just read. At C-time this character (blank) is written into memory. At D-time the input buffer IB is reset (again indicating a blank character). At E-time the character (.) in the output buffer OB is transferred to the input buffer via the gate G2. At F-time the OB is reset and MAR is stepped to the next character (*m*) to the left. During the next delay cycle at A-time the next character (*m*) is read into the output buffer OB. At B-time the character (.) in the input buffer IB is read into the memory where it is written at C-time at the location from which the character (*m*) in the OB was read. At D-time the input buffer IB is reset and at E-time the character (*m*) in the output buffer OB is transferred to the input buffer IB via the gate G2. At F-time the output buffer OB is reset and the MAR is stepped backward to the next character (*i*). In this manner each character to the left of the special character BD is moved left one position.

When the character (*i*) with the first P-bit is detected, this operation is varied. During the A-time, when the character (*i*) is moved into the output buffer OB, a P-bit is sensed by a signal on the P-bit sensing line. This is the last delay cycle, gate G1 being enabled and gates G2 and G3 being disabled at D-time. Whenever a regenerate cycle follows a delay cycle, a character is lost. The character (*m*) in the input buffer IB is at B-time transferred to the memory via the gate G3 and at C-time this character is written into memory at the position from which the character (*i*), now in the OB, was read. At D-time the input buffer IB is reset, gates G2 and G3 are disabled and G1 is enabled. The character (*i*) in the output buffer OB is not moved to the input buffer at E-time because the gate G2 is now inoperative. At F-time the output buffer OB, contents (*i*) including the first P-bit, is reset and the MAR is stepped backward to the location of the next character. At A-time the next character (*a*) is read into the output buffer OB and the P-bit is forced into the P-bit part of OB. At B-time this character (*a*) in the output buffer OB is read to memory via the gate G1 along with the P-bit placed in the output buffer. At C-time the P-bit and character (*a*) are written into memory. At F-time OB is reset and MAR is stepped to the next character (*r*) location. Standard backward regenerate cycles continue until the BD character is again detected.

The second P-bit (the one associated with the character "*p*" of the word "praise") will not affect the operation, though it causes a signal on the P-bit sensing line unless the first P-bit has been shifted to the character (*r*) adjacent to the character (*p*) with the second P-bit.

When the special character BD is encountered the second time a second blank is inserted to its left, delay cycles are again entered, all characters to the left of the special character BD being shifted one place left. When the first P-bit is again encountered, it now being associated with the character "*a*," regeneration cycles are re-initiated. Thus the character "*a*" is destroyed, it being in the OB where it is destroyed after the character (*r*) in the IB is read into memory in its place. The first P-bit is shifted to the next character (*r*). The apparatus continues in normal regeneration cycles until the special character BD is encountered a third time. At this time another blank is inserted to its left and delay cycles are started, all characters to the left of BD being moved left one space, the character "*r*" being destroyed when the regenerate cycles begin again. The decoding circuitry includes means for recognizing when two adjacent P-bits occur.

The first P-bit (associated with the character "*r*") is detected in the OB and is held there by the P-bit control. The second P-bit, associated with the character "*p*," is read from memory into the output buffer OB P-bit portion during A-time of the next cycle. When a P-bit is read into OB while a P-bit is held in the OB a signal will be generated on the recognition signal line which terminates the operation of the deletion and closure feature. After the character (*r*) with the first P-bit is destroyed as described, MAR will enter normal forward regenerate cycles and the BD character will be ignored. As a result of the delete and closure operation three blanks will have been inserted to the left of the special character BD and all characters to the left of these blanks will have been shifted three positions, destroying the record denoted by the two P-bits. Thus, in Table IV "After," the three characters "rai" of the word "praise" have been deleted. The second P-bit is now the only P-bit remaining:

TABLE V

| Insertion | |
|---|---|
| Before | After |
| p<br>Friends, Rom | p<br>Frixends, Rom |

The insertion operation, as shown in Table V, involves the placing of a character (*x*) from the keyboard in the position preceding the character (*e*) associated with the P-bit. In Table V "Before" the character "*e*" of the word "Friends" has a P-bit associated with it. Thus, this letter will appear brightened on the CRO face. When the keys "inserts" and "*x*" are hit, in that order the character "*x*" is inserted in place of the character "*e*," and all characters to the right of this position, including the character "*e*," are shifted right one place. If a character EOR is placed in the copy, shifting will end at this character. The P-bit remains associated with the same character "*e*" with which it was originally associated.

When the keys "insert" and "*x*" are struck, the character "*x*" is entered into the input buffer IB where it remains until the P-bit is detected. Normal forward regeneration cycles occur until the P-bit is detected. The character "F" is at A-time read from the memory into the output buffer OB. At B-time it is made available to the memory via the gate G1, and is written into the memory at C-time. The input buffer IB is not reset at D-time because the reset circuitry is disabled. At F-time the output buffer OB is reset and the memory address register MAR stepped forward to the address of the next character (*r*). During the next A-time the character "*r*" is read into the output buffer OB. At B-time this character is transferred to the memory for writing at C-time. In the same manner, during the next A-time the character "*i*" is read into the output buffer OB for subsequent writing in memory. During the following A-time the character "*e*," which has a P-bit associated with it, is read into the output buffer OB. The P-bit is sensed by a signal on the P-bit sensing line. As a result, the gate G1 is disabled and the gates G2 and G3 are enabled, delay cycles occurring from this point on. At B-time the contents (*x*) of the input buffer IB are read to the memory. At C-time the character (*x*) is written into the memory in the location of the character "*e*" just read out. At D-time the input buffer IB is reset and at E-time the contents (*e*) of the output buffer OB are transferred into the input buffer IB via the gate G2. The P-bit is held in the output buffer OB by the P-bit control, it being assumed that the IB does not have provision for holding a P-bit. At F-time the output buffer OB is reset, with the exception of the P-bit, and the memory address register MAR is stepped to the next address (of the character "*n*"). During the next B-time, the P-bit is entered into memory (via G1 which is temporarily enabled to pass the P-bit) along with the character (*e*) stored in the input buffer IB. During subsequent delay cycles, each character is read out of memory into OB and replaced from IB by the previously read character. In this manner all characters are shifted right one position to make room for the character (*x*) which was inserted to the left of the character (*e*) with the P-bit. Shifting stops when the MAR steps to the address of the last position on the page or when EOR character (if used) is recognized by the decoder. Blank characters may be shifted in the same manner as other "significant" characters, or they may be treated specially, only one blank at the end of a line (with a plurality of blanks at the end) being shifted to the beginning of the next line.

TABLE VI

| Recomposition | |
|---|---|
| Before | After |
| Romans, coun | Romans, _ |
| try-men, lend | country-men,_ |
| me your ears _ | lend me your _ |

Recomposition will be explained with reference to Table VI. It is obvious from the insertion operation (Table V) and the deletion operation (Table IV) that one or more characters may be split at the end of a line, due to the movement of characters during delay cycles. It is improper for the operator to enter non-blank characters into the last EOL column (underlining in Table VI) from the keyboard even though the P-bit moves to the EOL position before going to the beginning of the next line. Thus, if significant characters appear in the EOL position (characters "*n*" and "*d*" in Table VI), they must have been shifted there during automatic editing operations. It is assumed that characters detected in the EOL position are part of an improperly split word which should be moved as a complete word to the next line.

In Table VI "Before" the word "country" is properly split (though without a hyphen) and the word "lend" is not split at all. Since each word has a character in the EOL position, the entire word will be shifted as shown in Table VI "After". Any new words (for example "ears") moved into the EOL position column are also readjusted so that the entire record is recomposed in a manner that no characters will appear in the last column. Recomposition is carried out to the end of the page unless an EOR character was inserted and is detected.

The recomposition operation is initiated by striking the "recompose" key on the keyboard. This key starts the memory address register (MAR) stepping forward every F-time by means of an initial signal on the "Forward" line, and causing "running" of the P-bit. That is, signals are regularly applied to the P-bit positioning circuitry (explained with reference to Table II) once for every complete regeneration of a page. The P-bit will advance forward one position for each N normal forward regenerate cycles (when N is the number of positions on a page). Normal forward regenerate cycles continue until the P-bit reaches the EOL position of the first line (the first line in Table VI) having a character (*n*) in the EOL place. The decoder emits a signal on the recognition signal line when a character (other than a blank character) in the EOL position has the P-bit associated with it. When this occurs a signal is applied on the MAR backward line, the memory address register (MAR) thereafter being stepped back one position at every F-time. P-bit running is suspended, the P-bit may be moved to the left, or it may remain in the EOL position, as the MAR steps backward in normal backward regeneration cycles until a blank character is detected. This condition is signaled by means of another signal on the recognition signal line of the decoder. When the blank character is detected a signal occurs on the forward line and the MAR again steps forward at every F-time. During the first of its forward steps an insertion operation of the type explained with reference to Table V is performed. Gate G1 is disabled and gates G2 and G3 are enabled for a series of delay cycles. A blank is inserted in place of the first character (blank) when there is a change from a regeneration to a delay cycle, since the input buffer IB is initially empty, and all characters to the right (including the original blank) are shifted one position. Thus at an A-time a blank character is read into OB. During B-time the contents (blank of IB) are read to the memory via G3 and at C-time entered into memory. At E time the contents (blank) of OB are sent to IB. At F-time OB is reset and MAR is stepped forward to the next character (*c*). During the next A-time the character (*c*) is read from memory. During B- and C-times the contents (blank) of IB are sent to and written into memory in the location from which the last character (*c*) was read. At D-time IB is reset and at E-time the OB character (*c*) is transferred to IB. At F-time the OB is reset and MAR is stepped forward to the location of the next character (0). The delay cycles continue. The P-bit does not "run" during the delay cycles until the end of the page or until an EOR character is detected. In Table VI "Before," the character "*n*" in the EOL position of the first line is shifted to the first position of the second line. The character "*u*" now occupies the EOL position of the first line. All subsequent characters (including blanks) are shifted right one place. When the end of the page (or EOR character) has been reached forward regeneration cycles with a "running" P-bit again take the place of the delay cycles and the operation starts again at the beginning of the page. The P-bit will next coincide with the character "*u*" in the EOL position, the P-bit stops running, a second blank will be inserted in front of the blank preceding the first character (*c*) of the split word and all subsequent characters, including the original blank, will shift right one place. At the end of the page or at EOR detection, the backward regeneration cycles resume and the P-bit again runs. These operations will continue until the "running" P-bit no longer coincides with any characters (other than blanks) in the EOL positions.

Referring to Table VI "After," the recomposed copy is illustrated. As previously explained, blank characters may be shifted from the end of one line to the beginning of the next as they occur, or (if desired) only if a significant character occurs to the left of the blank.

It is obvious that many additional operations may be performed using the apparatus illustrated in FIGURE 4*a*. These operations are intended to be merely illustrative of the many types that may be performed. Detailed circuitry of an embodiment of the invention is shown in FIGURES 5*a* and 5*b*. The structure of this detailed embodiment will now be described.

DESCRIPTION AND OPERATION

*FIGURES 5a and 5b*

Referring to FIGURES 5*a* and 5*b*, the memory is shown in FIGURE 5*b* by the block labeled core memory. The memory may be any storage unit capable of holding binary information in the form of states. For purposes of illustration, a random access magnetic core array is used as the memory in this embodiment. Information is written into memory on a write cable and information is read from memory on a read cable. The P-bit is entered on a separate line labeled "P". Information is written into and read from locations specified by signals from the memory address register MAR. The MAR signals are changed to indicate a new location every time a "step" signal is applied on input F at F-time. The direction in which the MAR is stepped is changed by signals on either a backward input line RB or a forward input line RF. If the MAR is to be stepped in the forward direction to read copy stored as states in the core memory from left to right and top to bottom, a signal will initially be applied on the line RF. This sets a bistable device in MAR to a first state, at which state it remains set until changed. As long as it is set to this state the MAR will be stepped forward one character address at each F-time. If the MAR is to be stepped backwards (stored copy being read right to left, bottom to top), a signal will initially be applied on the line RB. This sets the bistable device to a second state, to which it remains set until changed. MAR is stepped backward one character address each F-time as long as the bistable device remains set to the second state. The memory may be cleared by a signal on the clear memory input line.

The signals from MAR represent characters, the characters being stored in core storage at positions corresponding to a number of pages of copy, each page comprising paragraphs, lines, words and characters. When the MAR reads forward it addresses successive characters from the first lefthand character of the top line to the last righthand character of the bottom line. The MAR steps back to the first character of the first line after addressing the last character of the last line. The address of the first character of a line is signaled after the location of the last (EOL) character of the preceding line is signaled. The reverse operation occurs when MAR is stepped backward.

All timing signals are generated by the Timing Ring shown in FIGURE 5*b*. The pulses appear on different output lines A through F in the order shown in previously described FIGURE 4*b*. There is an output on line A at A-time when the memory is read: at output line B at B-time when the output buffer OB and input buffer IB are gated into memory; at output line C and C-time when memory is written into; at output line D at D time when the input buffer IB is reset; at output line E at E-time when data is transferred from the output buffer OB to the input buffer IB; and at output line F at F-time when the output buffer OB is reset and the memory address register MAR is stepped.

The decoder and CRO are shown by a block in FIGURE 5*b*. As previously mentioned, the CRO and portions of the decoder are disclosed in the co-pending Skiko et al. application. The CRO and decoder block contain additional well-known decoder circuitry for emitting signals when specified characters are present in the output buffer OB, and when the MAR is set to certain addresses.

If the output buffer OB contains a blank character (BL) the decoder, by standard techniques, generates a signal on the BL output line. If the character in the input buffer IB is any character other than a blank character ($\overline{BL}$) a signal will appear on the $\overline{BL}$ output line. Similarly, detection of the special character BD, which may denote the end of a paragraph in which a deletion occurs, causes a signal on the BD output line. Whenever the MAR steps to the address of the last EOL position of a line, a signal will be generated on the EOL line. The end of a record may be designated by a special character EOR which, when recognized, initiates a signal on the EOR output line. When the MAR steps to the last character position on a line a signal appears on the END line. Similarly, the beginning of a page is indicated by a signal on the BEG line.

The output buffer OB, which is a standard register with a bi-stable stage for each bit position is shown in FIGURE 5*b*. One position is provided for each bit of the characters read from memory, including the P-bit which is separately indicated. The reset input is used to reset all of the OB stages, except the P-bit, to their initial conditions. A separate line is used for resetting the P-bit. The read bus from the core memory is used to set the stages to conditions indicating the character read from core memory. An output bus connects the OB positions to utilization circuits. A separate line from the read bus sets the P-bit and a separate output line is used to sense the occurrence of a P-bit. Additional lines are provided for setting the P-bit from other sources than the core memory.

The input buffer IB is shown in FIGURE 5*a*. One position is provided for each character bit except the P-bit, for which no provision is made. A signal on the reset line will reset all positions of the input buffer IB. An output cable connects the IB to a gating circuit A–G3.

The regenerate gate A–G1 used in regenerated cycles is shown in FIGURE 5*a*. This circuit is an AND gate which receives character bits from the output buffer OB and transfers them to the core memory when signaled on the gate input line. The P-bit is entered into the regenerate gate on a separate line. The P-bit is gated out even if there is no gate input signal, unless there is a signal on the line labeled "P-bit inhibit." An output cable connects the gate A–G1 to an OR circuit $O_M$. A separate output line is provided for the P-bit position.

The insert/delete gate A–G2 used in delay cycles is shown in FIGURE 5*a*. Character bits with the exception of P-bits are transferred from the output buffer OB to the gate A–G2 via a bus. The gate A–G2 is operated when there are signals on the lines "gate" and "E" (at E-time), the output of the gate A–G2 being supplied to the input buffer IB via an OR circuit $O_I$.

The enter gate A–G3 used in delay cycles appears in FIGURE 5*a*. This circuit is used to transfer the contents of the input buffer IB to the core memory via OR circuit $O_M$ upon a signal on the gate line. This circuit is similar in construction to the gates A–G1 and A–G2. Gate A–G3 does not have provision for a P-bit.

Characters are entered from the keyboard into the input buffer IB via the "characters from keyboard" line. These characters can be represented by signals in any parallel or serial code desired. For the purposes of this description, these characters are all represented by binary signals entered from the keyboard serially by character, parallel by bit. Characters that may be entered are illustrated by the keys in FIGURE 2: A through Z (upper and lower cases), 2 through 0 (lower case, and special characters in the upper case), punctuation marks, arithmetic signs, EOR, BD, P-bit and blank characters.

Both the keyboard and the gate A–G2 have access to the input buffer via the OR circuit $O_I$. The gate A–G3 and the gate A–G1 have access to the core memory via OR circuit $O_M$. Only OR circuit $O_M$ has provision for a P-bit.

Normal operation of the embodiment of FIGURES 5*a* and 5*b* is the regenerate cycle. A location of core memory is sequentially scanned by stepping MAR, the characters so addressed are read into OB, transferred via A–G1 and $O_M$ to memory and written into memory in the position from which read. The contents of core memory are scanned from the beginning of the page to the end and then back again to the beginning of the page by stepping the MAR forward one character position every F-time during forward regenerate cycles (the reverse operation occurs during backward regenerate cycles). At the beginning of each page, there is a signal from the decoder on the output BEG line. This causes a signal to appear at one input of each one of AND circuits $A_1$ and $A_2$. Initially, there is no input to the OR circuit $O_I$, AND circuit $A_2$ therefore having both inputs present, an output occurring on read forward line RF. The output on line RF is applied to the MAR, setting its internal bistable device to a first state, causing it to count forward at every F-time until some other signal is applied on line RB. At A-time (indicated by a timing ring output signal on line A) the core memory is read and the contents at the character location indicated by the MAR are sent to the output buffer OB via the read bus. The contents of the output buffer OB, are available to the cable going to both the regenerate gate A–G1 and the insert/delete gate A–G2 as well as the decoder and CRO. During regenerate cycles, however, the gate line to the insert/delete gate A–G2 is not signaled, making this gate inoperative. The inhibit inputs to the AND circuit A3 and the P-bit position of A–G1 are normally not present so that at B-time there will be a gate input to the regenerate gate A–G1, the contents of the output buffer OB being transferred via the OR circuit $O_M$ to the core memory write bus for entry into core memory at C-time into the same location from which the character was read. The next operation during a regenerate cycle occurs at F-time, when the output buffer OB is reset by a signal on its reset line (the inhibit input to AND circuit A8 is normally not present so that the P-bit position is also reset) and when the MAR is advanced forward to the next character by a signal on its F input.

If during a normal regenerate cycle a P-bit is associated with a character read from the core memory read bus into the P-bit position of the output buffer OB, the P-bit is transferred to core memory via the P-bit portions of the regenerate gate A–G1 and the OR circuit $O_M$. In normal regenerate cycles the P-bit is not separated from the character with which it is associated.

CHARACTER ENTRY

Characters are entered from the keyboard by striking a character key on the keyboard during a regenerate cycle. A signal will occur at the input labeled "any KBC" and signals representing the character struck will appear on the "characters from keyboard" cable, these signals being entered in the input buffer IB via the OR circuit $O_I$. The signals representing the character to be entered from the keyboard are stored in IB for use when needed. The signal on the input line any KBC will cause the KBC trigger to be set to the one state. A normal series of regeneration cycles continues, as previously described, until a character having a P-bit associated with it is read into the output buffer OB, at an A-time causing the lines labeled P-bit in OB to have signals applied to them. The trigger KBC one output places a signal on one input of the OR circuit $O_2$, which in turn applies a signal to one of the inputs of the AND circuit $A_4$. The other input of the AND circuit $A_4$ receives a signal from the P-bit in OB line via the OR circuit $O_{10}$. Thus, AND circuit $A_4$ emits a signal from its output when a P-bit occurs in the output buffer OB after a character has been entered from the keyboard. This output signal is sent to the AND circuit $A_5$ (which will later apply a gate signal to the enter gate A–G3), another signal is applied to the AND circuit $A_3$ and still another signal is sent to the P-inhibit circuitry which will control the moving of the P-bit. The output of the AND circuit $A_5$, which occurs at B-time, causes the reset IB trigger to be set to the one state and also gates the contents of the input buffer IB to core memory via the enter gate A–G3. The output of the AND circuit $A_4$, applied to the AND circuit $A_3$, inhibits the gating of character bits from OB at B-time via the gate A–G1. Since the enter gate A–G3 is operated, and the gate A–G1 is disabled, at B-time the character read into the output buffer OB at A-time is not read into the core memory, but rather the character placed in the input buffer IB from the keyboard is read into the memory in its place. The P-bit in OB is inhibited from passing through A–G1 by an inhibiting signal from the P-bit inhibit trigger which is set to the one state by outputs from the KBC trigger and the AND circuit $A_4$ via the AND circuit $A_7$ and OR circuit $O_3$ in the set P-inhibit circuitry. When this trigger is set to the one state the P-RESET INHIBIT trigger is also set to the one state, inhibiting the P-bit in the output buffer OB from being reset at F-time.

At D-time the input buffer IB is reset, destroying the keyboard character stored therein. At E-time the RESET IB trigger is reset, disabling gate A–G3 and AND circuit $A_6$ (which controls IB reset), and the KBC trigger is reset, enabling A–G1. At F-time, the output buffer OB is reset with the exception of the P-bit, which is not reset, though it would normally be reset because the inhibit input of AND circuit $A_8$ is activated by the operation of the P-RESET INHIBIT trigger which is set to one. At F-time also the AND circuit $A_9$ has signals at all inputs, causing the P-BIT INHIBIT trigger to be reset to zero. The P-RESET INHIBIT trigger remains set to one.

During the next cycle of operation the next character will be transferred from the core memory to the output buffer OB at A-time in a normal regenerate cycle. Since the KBC, RESET IB and P-BIT INHIBIT triggers are reset, gate A–G3 is disabled and gate A–G1 including its P-bit position are enabled. The P-bit stored in the output buffer OB will now be associated with this new character rather than the previous character. At B-time all the output buffer OB contents are sent to the memory via the regeneration gate A–G1 and OR circuit $O_M$, the P-bit being written into memory at C-time along with the character bits. When the P-bit is read through the OR circuit $O_M$ to the core memory write bus, the reset input of the P-RESET INHIBIT trigger will receive a signal causing it to be reset to zero. During F-time the AND circuit $A_8$ will not be inhibited, the P-bit being reset along with the character bits in the balance of the output buffer OB. In this manner the character in memory having a P-bit associated with it is replaced by a character entered from the keyboard.

P-BIT POSITIONING

Positioning of the P-bit is controlled by signals on the following lines in FIGURE 5*b*: "horizontal forward space," "horizontal back space," "vertical forward space" and "vertical back space." A signal on any one of these lines moves the P-bit in the indicated direction. A signal on either the horizontal forward space line or the horizontal back space line sets the trigger HS to the one state via the OR circuit $O_4$. A signal on either the vertical forward space line or the vertical back space line sets the trigger VS to the one state via the OR circuit $O_5$. Signals on either of the lines horizontal back space or vertical back space sets the trigger BS to the one state via the OR circuit $O_6$. Thus, the three triggers HS, VS and BS record the P-bit positioning requests received on the P-bit positioning input lines. The one outputs of the triggers HS and VS go to the P-inhibit set circuitry through an OR circuit $O_7$, the one output of the trigger VS additionally going to the set input of the P-INHIBIT RESET DELAY trigger. If the trigger HS is set to the one state, the trigger PI is set to the one state. If the trigger VS is set to the one state, then the triggers PI and P-INHIBIT RESET DELAY are both set to the one state. The one output of the trigger PI is connected to one input of the AND circuit $A_{10}$. The beginning of every page is indicated by a BEG signal on the other input of the AND circuit $A_{10}$. The output of AND circuit $A_{10}$ is applied to OR circuit $O_3$, causing the P-BIT INHIBIT and P-RESET INHIBIT triggers to be set to the one state. These triggers act, as previously explained, to hold the P-bit in the OB, by preventing reset at F-time, and block its transfer to memory by inhibiting the P-bit part of A–G1 until the character after the one with which it was originally associated enters the OB. In this manner, P-bit adjustments are recorded at the time the control keys are struck, but are not executed until the beginning of the page is reached, at which time the P-bit nearest the beginning of the page (when going Forward) is shifted to the right. When operating in a backward regenerate cycle, the P-bit nearest the bottom of the page is shifted left.

For instance, if the horizontal forward space key is struck, trigger HS is set to the one state. When MAR steps (forward or backward) to the beginning of the page, a BEG signal causes the MAR input RF to receive a signal. MAR steps forward each F-time and characters are routed in normal forward regenerate cycles. Further, the P-BIT INHIBIT and P-RESET INHIBIT triggers are set to one. When the characters having a P-bit is transferred to the output buffer OB at A-time during any of the regenerate cycles, it is not transferred to memory via gate A-Gl because the one output of the P-BIT INHIBIT trigger inhibits the gating of the P-bit along with the character bits from OB. At C-time only the character bits are written into memory. At F-time OB is reset with the exception of the P-bit due to inhibiting of $A_8$ by the P-RESET INHIBIT trigger output. At F-time also, there is an output from AND circuit $A_9$ which resets the trigger PI and the trigger P-BIT INHIBIT. As a result, the regenerate gate A-Gl is no longer blocked from passing the P-bit. When the next character is set into the output buffer OB (at A-time) and is transferred to core memory (at B-time) via the gate A–G1, the P-bit will be transferred along with this next character through the gate A–G1. When the P-bit is detected at the output of the OR circuit $O_M$, the trigger P-RESET INHIBIT is reset. During F-time the output buffer OB P-bit portion will be reset by a signal from the AND circuit $A_8$, this same signal resetting the HS trigger. In this way the P-bit is moved one position to the right. If the horizontal back space key had been struck the operation would have been identical except that the MAR input RB would have been signaled by a BEG signal at AND circuit $A_1$, causing MAR to step back once each F-time. Therefore, the P-bit would have been shifted one position.

If a vertical forward space or back space operation had been called for the operations just described with reference to horizontal P-bit positioning would have begun in an identical manner. However, the P-bit portion of the output buffer OB will not be reset in the same manner due to the action of the reset P-inhibit circuitry initiated by the setting of the trigger VS, which causes the P-INHIBIT RESET DELAY trigger to be set. The one output of the P-INHIBIT RESET DELAY trigger is applied to an input of AND circuit $A_{11}$. When the P-bit is detected in the output buffer OB a signal is emitted from $A_{11}$ setting the single shot SS for a predetermined period. The period is calculated to be equivalent to the time required for the memory address register MAR to scan one line and reach the location of the character immediately below or above the character originally associated with the P-bit. This timing function can be done by a counter also. The output of the single shot SS blocks resetting of the P-BIT INHIBIT trigger, the P-RESET INHIBIT trigger and the PI trigger at F-time by inhibiting the AND circuit $A_9$. Thus the P-bit in the output buffer remains in its position (since the AND circuit $A_8$ is inhibited from resetting it by the P-RESET INHIBIT trigger) and is not transferred via the regenerate gate A–G1 (since the P-BIT INHIBIT TRIGGER blocks the passage of the P-bit). Normal regenerate cycles (forward or backward) continue with the P-bit remaining in the OB though the characters are transferred out through A–G1 to memory. When the single shot SS period ends, the AND circuit $A_9$ is no longer blocked, a signal emerging from the AND circuit $A_9$ to reset the P-INHIBIT RESET DELAY trigger, the PI trigger and the P-BIT INHIBIT trigger. As a result, the character presently in the output buffer OB is moved at a B-time to the core memory through the regenerate gate A–G1 with a P-bit associated with it, the resetting of the P-BIT INHIBIT trigger permitting passage of the P-bit from the output buffer OB to the core memory via the regenerate gate A–G1. As the P-bit is sent to memory its presence is sensed at the OR circuit $O_M$ output, causing the P-RESET INHIBIT trigger to be reset to the zero state. The P-bit in the output buffer OB is destroyed during the F-time after the transfer because the resetting of the P-RESET INHIBIT trigger permits the passage of an F-time signal through the AND circuit $A_8$. Thus the P-bit is positioned one line vertically.

The direction (forward or backward) of P-bit positioning is determined by the setting of trigger BS. As previously explained, this trigger is set to the one state by an output from OR circuit $O_6$ by signals on the horizontal back space or vertical back space lines. If the trigger BS is not set to one there will normally be no output from the OR circuit $O_1$. As a result, the AND circuit $A_2$ will be the only one enabled so that the memory address register MAR is set to read forward at the beginning (BEG signal) of the page as indicated by a signal from the output RF of the AND circuit $A_2$. At every F-time the memory address register MAR is advanced forward one character. If the trigger BS is set to the one state, then there will be an output from the OR circuit $O_1$, causing the AND circuit $A_2$ to be inhibited and an output to occur from the RB output of AND circuit $A_1$ when there is a signal on the line BEG; the memory address register MAR thereafter reading one character backward each F-time. The trigger BS is reset via a signal from AND circuit $A_{12}$ which occurs if the P-INHIBIT RESET DELAY trigger is reset while the P-RESET INHIBIT trigger is set. The resetting of the BS trigger does not affect the count direction of the memory address register MAR however, since it will continue in the direction indicated at the beginning of each page unless another direction is indicated by signaling the line RB or RF.

INSERTION

Insertion operations are initiated by striking a character key at the same time that the "insert" key is struck. A convenient modification is the addition of a mechanical or electronic "insert" latch permitting successive striking of keys after a single initial operation of the "insert" key. The trigger KBC will be set to the one state by striking of any character key causing gate A–G1 to be blocked and gate A–G3 to be operated when a P-bit is detected as previously explained with reference to keyboard entry of characters. The AND circuit $A_{13}$ will have both inputs "any kbc" and "insert" present causing an output signal to occur. This signal sets the trigger IKB via the OR circuit $O_8$, and resets a trigger PB, which is set whenever there is a P-bit in the OB, for purposes to be described later. Normal forward regeneration cycles are performed until the P-bit is detected.

When, at an A-time of a regeneration cycle, a P-bit is detected in the output buffer OB, as indicated by a signal on the P-bit line, a signal is applied to one input of the AND circuits $A_4$ and $A_{14}$ via the OR circuits $O_9$ and $O_{10}$. The one output of trigger IKB is applied to AND circuit $A_{14}$ directly, causing a signal to set the trigger IKP, enabling gate A–G2. Both inputs to AND circuit $A_4$ are present causing a signal to be sent to the inhibit circuit along with the signal from the KBC trigger. Since both inputs to the AND circuit $A_7$ in the set P-inhibit circuitry are present there will be an output from the OR circuit $O_3$, causing the P-BIT INHIBIT trigger to be set to the one state, which in turn causes the P-RESET INHIBIT trigger to be set to the one state. These triggers act to prevent resetting of the P-bit portion of the output buffer OB at F-time and also to disable the P-bit portion of the regenerate gate A–G1, as previously described. The reset of A–G1 is blocked by an inhibit signal to AND circuit $A_3$. The setting of the trigger IKP to the one state results in the enabling of the gate input of gate A–G2, which will at E-time pass the contents of the output buffer OB, with the exception of the P-bit, for which it has no provision. Thus a delay cycle is initiated, replacing the regenerate cycle.

At B-time there is an output from the AND circuit $A_5$, causing the RESET IB trigger to be set to the one state, gating the contents (a keyboard character) of the input buffer IB to the OR circuit $O_M$ via the enter gate A–G3. The gate A–G1 is completely inoperative due to blocking of AND circuit $A_3$ and the setting of the P-BIT INHIBIT trigger. The character from IB is entered into the core memory at C-time via the write bus in the location from which the character in the OB was read. At D-time the AND circuit $A_6$ has both inputs present, emitting a signal which resets the input buffer IB and the KBC trigger.

At E-time the RESET IB trigger is reset and the gate A–G2 is operated. The contents of the output buffer OB, with the exception of the P-bit are transferred to the input buffer IB via the gate A–G2. The P-bit is not transferred since there is no provision for the transfer of the P-bit via the gate A–G2.

Since at F-time there is a P-bit in the output buffer OB, the P-BIT INHIBIT trigger will be reset via the AND circuit $A_9$ (enabling at the next C-time, the passage of a P-bit through the AND gate A–G1). The OB contents, excluding the P-bit due to blocking of $A_8$ by P-RESET INHIBIT, are reset.

The next character is entered into OB during A-time. At B-time the previously read character, now in IB, is sent to memory. At C-time it is written into memory, along with the P-bit from OB into the location of the character just read from memory. The P-bit (from OB) thus remains associated with the same character (from IB) with which it was originally connected. As the P-bit is detected at the OR circuit $O_M$ output, the P-RESET INHIBIT trigger is reset, enabling AND circuit $A_8$. Also at B-time the RESET IB trigger is set to the one state via $A_5$. At D-time IB is reset by the RESET IB trigger through $A_6$. At E-time the IB is filled from OB via A–G2, and the RESET IB trigger is reset. At F-time OB and the P-bit position of OB are reset. As long as the IKB and IKP triggers remain set to the one state, A–G1 will be disabled (with the exception of the P-bit) and A–G2 will be enabled. Characters will thus pass through both OB and IB prior to writing into memory. The resultant one cycle delay causes a one character right shift compensating for the character entered from the keyboard into IB initially.

Delay cycles continue in this manner until the end of the page is reached, as indicated by an END signal from the decoder, or until an EOR character is recognized by the decoder. A signal on either the END or the EOR line causes an output from OR circuit $O_{13}$ which is applied to AND circuit $A_{15}$ along with the one output from the PB trigger, causing AND circuit $A_{15}$ to emit a signal via OR circuit $O_{12}$ which resets triggers IKB and IKP to the zero states. This disables the gate A–G2 directly and by disabling AND circuit $A_4$, enables AND circuit $A_{13}$, permitting operation of gate A–G1. Thus, regeneration cycles are reinitiated and the insertion operation is completed.

DELETION

The deletion and closure operation is initiated during forward regenerate cycles by pressing the "delete" key after certain preparatory operations have been performed. These preparatory operations include (a) the entry of a special character BD from the keyboard in the manner previously described with reference to keyboard entry of characters; (b) the positioning of the P-bit, by methods previously described, to indicate the last character of the record to be deleted; and (c) the entry of a second P-bit, as will be described, which must be positioned in the usual manner to indicate the character preceding the beginning of the record to be deleted.

The character BD is placed at the end of the point of adjustment for the record to be deleted. This normally is the end of the paragraph. The P-bit is initially associated with a character indicated by a bright spot on the CRO face. The P-bit must be moved to the end of the record where closure is to terminate by signals on proper ones of the positioning input lines from the keyboard, as previously explained. When the P-bit is properly positioned, as seen from the face of the CRO, the BD character key is struck. This results in entry of a BD character at the end of the record where closure is to end in the manner previously described. The PB trigger is reset when the BD character is entered.

The P-bit must then be repositioned by proper signals from the keyboard on the space inputs until it is associated with the last character of the record to be deleted.

It is next necessary to insert a second P-bit by striking the "insert P-bit" key. This causes a signal to appear at the "insert P-bit" input of FIGURE 5*b*. When a signal appears at the insert P-bit input the trigger IPB is set to the one state. An input of the AND circuit $A_{16}$ has a signal applied to it from the one output of the trigger IPB. The characters from the core memory are continuously brought into the output buffer OB and returned to core memory via the gate A–G1 during normal forward regenerate cycles until the beginning of the page is reached, as indicated by a decoder output signal on the line BEG. As a result of the BEG input, AND circuit $A_{16}$ emits an output to the OR circuit $O_{14}$, causing a P-bit to be placed into the output buffer OB P-bit section. At this time also, the IPB trigger is reset. The character in the output buffer OB, located in storage at the first position of the first line, is transferred at B-time to the core memory via the regenerate gate A–G1, the P-bit being carried along with the character bit. Therefore, a second P-bit is entered on the CRO face at the topmost lefthand corner of the page. Operation of the forward space keys will cause this second P-bit to be moved as directed until it is associated with the character preceding the first character of the record to be deleted.

It is now possible to begin the delete and closure operation by striking the delete key causing a signal to appear on the "delete" input line, setting the trigger DLT to the one state. The one state of the DLT trigger is applied via the OR circuit $O_I$ to inhibit the AND circuit $A_2$ from generating a read forward signal RF. Normal forward regenerate cycles continue after the DLT trigger is set until the beginning of the page is again reached as indicated by a BEG signal. An RB signal then emerges from AND circuit $A_1$, the memory address register MAR being counted backward at every F-time thereafter. The trigger DLB is set via AND circuit $A_0$, enabling one input of $A_{18}$.

During subsequent backward regenerate cycles the special character BD will be sensed. The decoder will emit a signal on output BD at A-time, which is applied to the other input of the AND circuit $A_{18}$. As a result, a signal from the output of AND circuit $A_{18}$ sets the trigger DBD to the one state, applying a signal to one input of each of the AND circuits $A_{19}$ and $A_{20}$, and also to the AND circuit $A_{14}$ via the OR circuit $O_9$. At B-time the character in OB (BD) is transferred to memory via gate A–G1 for writing in memory at C-time in the location from which it was read. At D-time a signal from the AND circuit $A_{20}$ is applied to one input of the OR circuit $O_8$, causing the IKB trigger to be set to the one state. As a result both inputs of the AND circuit $A_{14}$ have signals applied to them, causing the IKP trigger to be set to the one state. As previously explained with reference to the insert operation, these triggers terminate regeneration cycles and initiate delay cycles, disabling gate A–G1 (via $O_{10}$, $A_4$ and $A_3$) and enabling gate A–G2 (directly). Gate A–G3 is enabled via AND circuit $A_4$ at every B-time. The character BD is not transferred to IB since OB is reset at D-time as shown in FIGURE 5*b*. In the next cycle (a delay cycle) at A-time the next character is read into OB. Since the IB is empty at the beginning of the first delay cycle, a blank character is read into memory from the IB at B-time in the location of the character just read into OB. Thus a blank is inserted to the left of the character BD and each subsequent character, reading backward, is shifted left one position.

These delay cycles continue until the character read from core memory to the output buffer OB has a P-bit (the first) associated with it.

In the case of the detection of the first P-bit it may be assumed that the next adjacent character to the left does not have a P-bit (the second) associated with it. When a character with a P-bit is detected a P-bit in OB signal leaves OB. This signal is applied to the AND circuit $A_{19}$ and to the AND circuit $A_{22}$. At B-time the previous character is sent to memory from IB to be written at C-time.

At D-time the AND circuit $A_{19}$ emits a signal setting a trigger DBP (which is reset at the next C-time) to the one state and applies a signal through the OR circuit $O_{12}$ to reset the IKB and IKP triggers. An indication that the first P-bit occurred is stored, and the delay cycles end. The resetting of the IKP trigger disables the gate A–G2 and the resetting of the IKB trigger disables the gate A–G3 via the AND circuits $A_5$ and $A_4$. A regenerate cycle is initiated, gate A–G1 being enabled by the reset of IKP and IKB. Gate A–G2, no longer operative at E-time, so that the character which had the P-bit is not put in IB. At F-time this character (and the associated P-bit) in OB is destroyed. At A-time a new character is read into OB. At A-time also, AND circuit $A_{22}$ is operated, the first P-bit having set the DBP trigger and the present character not having a P-bit to inhibit $A_{22}$. As a result a P-bit is "forced" into OB via $O_{14}$ and trigger DBD is reset. At B-time this new character is read through the gate A–G1 along with the P-bit to the core memory for writing at C-time in the location from which it was removed. DBP is reset at C-time. The OB including the P-bit part is reset at F-time. Normal backward regenerate cycles ensue, the first P-bit being associated with the character to the left of the one with which it was originally associated, the original character being destroyed in the OB due to the transition from delay cycles to regenerate cycles.

When at A-time the second (non-adjacent) P-bit is detected in OB the P-bit in OB line is signaled. However, this first P-bit resets the DBD trigger through OR circuit $O_{15}$ disabling AND circuits $A_{19}$ and $A_{20}$. Therefore, the second P-bit cannot cause the regenerate cycles to change to delay cycles. The second P-bit, when it occurs, is transferred with the associated character from OB to memory.

Reverse regenerate cycles continue until the BD character is again detected. When this occurs, a blank is inserted to the left of BD, delay cycles cause all characters to the left of BD to shift left one place from their original positions until the first P-bit is detected. If the second P-bit is not adjacent to the first P-bit regenerate cycles are started, the character associated with the first P-bit being destroyed and the P-bit being shifted left to the next character. In this way the characters of the record to be deleted are destroyed one by one, the P-bit being advanced left from the destroyed character to the next one each time after BD is detected.

During the A-time following a character with a P-bit the AND circuits $A_{22}$ and $A_{23}$ are sampled. If the adjacent character (the next character in OB), has the second P-bit associated with it, there will be an output from AND circuit $A_{23}$, the first P-bit setting DBP and the second P-bit enabling $A_{23}$.

The character in the output buffer OB with the second P-bit associated is handled in the same manner as any character in backward regenerate cycles. The only difference is that at A-time the $A_{23}$ output resets trigger DLT (signaling line RF when there is a BEG signal), in addition to triggers DBD and DLB. When the BD character is later detected it will have no effect, normal forward regeneration cycles continuing.

The OB character is at B-time sent to memory, with the second P-bit, via A–G1. Since the first P-bit was destroyed with the preceding character in OB and since AND circuit $A_{22}$ is not enabled to place a P-bit in OB, this second P-bit is now the only P-bit on the page. At C-time the character and P-bit are entered in memory at the same location from which it was removed. At F-time the OB is reset. Normal backward regenerate cycles continue until the top of page (BEG signal) when the zero state of the DLT trigger causes an RF signal to be sent to MAR via $A_2$. Normal forward regenerate cycles now resume the delete and closure operation being completed.

RECOMPOSITION

The recompose operation is initiated by a signal on the recompose input line during a normal forward regenerate cycle, causing the REC trigger to be set to the one state. This supplies a signal to one input of AND circuits $A_{21}$ and $A_{22}$. An output occurs from $A_{22}$ to set triggers P-BIT INHIBIT and P-RESET INHIBIT via OR circuit $O_3$ to block the P-bit portion of gate A–G1 and prevent resetting of the P-bit part of OB. The P-bit, when detected, causes those triggers to be reset, as previously described with reference to P-bit positioning, as a result, the P-bit is advanced once for every complete regeneration of a page. The P-bit "runs" across the page top to bottom, left to right.

When a P-bit occurs in the output buffer OB, the P-bit in OB line signals an input of AND circuit $A_{21}$. If the decoder detects that this character is not a blank character ($\overline{BL}$) it will generate a signal on output line $\overline{BL}$, which signal is applied to another input of the AND circuit $A_{21}$. If the MAR is at this time addressing the last position (EOL) of a line the decoder EOL signal is applied to still another $A_{21}$ input. Thus, the trigger RPC will be set to the one state, generating an RB signal via the AND circuit $A_{24}$ (and disabling AND circuit $A_{22}$) if a P-bit is associated with a significant character in the EOL position. Inhibition of $A_{22}$ stops P-bit running. The memory address register MAR will count backward at the next F-time. There will also be an output from the AND circuit $A_{24}$ via the OR circuit $O_4$ of the forward space logic, causing the HS trigger and subsequently the PI triggers to be activated to the one state. The P-bit will be moved one position left (since RB is signaled) moving it out of the EOL position by a P-bit shifting operation, signaled through $A_{27}$, which is executed as previously described.

The character read into the output buffer OB at A-time is transferred to the core memory via A–G1 at B-time to be written at C-time at the address from which it was read. The P-bit is, however, not transferred from the output buffer OB, the P-bit being retained in the output buffer OB because the P-BIT INHIBIT and P-RESET INHIBIT triggers are set by $A_{27}$ via $O_3$. As a result, the characters next to the character in the EOL position is stored into core memory, at the address from which it was read, with the P-bit.

When a blank character (BL) enters the output buffer OB at an A-time the decoder will generate a signal on the output line BL and end the signal on the output $\overline{BL}$. AND circuit $A_{24}$ is disabled, MAR being signaled immediately on line RF from the trigger TR. The memory address register MAR will be permitted to count forward. The blank character in the output buffer OB will be transferred at B-time to the core memory for writing at C-time via the regenerate gate A–G1. At D-time there will be a signal from the AND circuit $A_{25}$, which is supplied to the set input of the trigger IKB via the OR circuit $O_8$ initiating a delay cycle as previously described wherein A–G1 is disabled and A–G2 and A–G3 are enabled. The one output of the trigger IKB is also applied to reset the RPC trigger and to inhibit the operation of the AND circuit $A_{22}$. The P-bit remains with the character adjacent the EOL character. Thus at the next A-time the first character to the right of the blank is read into OB. At B-time the empty (blank character) IB is connected to memory via A–G3 for writing at C-time. At D-time the IB is reset and at E-time the OB character is transferred to IB. Thus a blank has been inserted to the left of the blank preceding the word which has a character in the EOL position. All subsequent characters to the right are shifted one position to the right. Forward delay cycles continue to the end of the record indicated by end of record character EOR, or to the end of the page indicated by a signal on line END to the OR circuit $O_{13}$. The $O_{13}$ output signal is applied to the AND circuit $A_{15}$ causing the delay cycles to end. However, the recompose operation with forward regenerate cycles and P-bit "running" resumes unless the REC trigger is reset.

The next time a P-bit coincides with a significant non-blank character at the end of the line the operation just described will recur. That is, the memory address register MAR will run backward in backward regenerate cycles until a blank character is detected. When a blank character is detected a forward delay cycle will start, a blank being written to the left of the detected blank, and all characters being spaced to the right one position. Again at the END or EOR signal forward regenerate cycle with P-bit running will resume unless the REC trigger is reset.

If at some time no characters are found at the end of line EOL positions, then the P-bit will eventually "run" to the end of the page or record. If the P-bit is associated with the last character at the end of the page (or the end of the record) then both inputs of AND circuit $A_{26}$ will be present, causing the REC trigger to be reset, ending the recompose operation.

An automatic editor capable of performing character entry from a keyboard, insertion of characters, deletion of characters and recomposition of copy has been described. The apparatus envisions monitoring of the copy on the face of a CRO during the operations. It is obvious that any type of display, or no display at all, may be used and further that the keyboard may be replaced by any type of entry device desired such as a card reader, card punch, etc. Further, it is possible to utilize this apparatus in conjunction with a data processing system so that entry is controlled by a stored program.

While the invention has been particularly shown and described with reference to a preferred embodiment thereof, it will be understood by those skilled in the art that the foregoing and other changes in form and details may be made therein without departing from the spirit and scope of the invention.

In the claims:

1. An automatic editing apparatus including a storage means for storing representations of a plurality of characters, said storage means having a plurality of single character storage locations having sequential addresses, a storage control device cyclically operable to read said stored character representations from said sequentially addressed storage locations and settable to write either said character representation or a designated substitute character representation back into either the same or an immediately adjacent location, a character display unit connected to receive all said character representations as they are read by said control device and to present a representation of each of said characters at a display unit position corresponding to the storage address from which the character representation was read and a selectively operable control means having connections to said storage control device to change the setting of said storage control device when a selected character representation is read from one of said storage locations.

2. An automatic editing apparatus controllable to display and to selectively alter data to be edited, said apparatus including a storage means for storing representations of the characters of the data to be edited, said storage means having a plurality of character storage locations having sequential addresses; a display means having a like plurality of character display locations and controllable to present representations of said data characters, storage control means to continuously and sequentially read the character representations stored in said sequentially addressed storage locations and to transmit said character representations to said display means for presentation at a corresponding display location, means settable in said storage means for specially identifying one or more character storage locations, means activated by said storage control means when said identified character storage location is read to control said display means to distinguish the character read from said storage location, and a keyboard entry means connected to said storage control means to specify editing operations to be performed on the character representations stored in said specially identified storage locations.

3. An electronic data editing means for performing selective editing operations on stored data, said means including a data storage means having a plurality of sequentially addressed positions, each position for storing a representation of one of the individual characters of said data and each position including a part for storing an identifying representation with any selected character representations, storage position selecting means selectively operable to successively select storage positions in either a normal or a reverse sequence, reading means for successively reading characters of data and corresponding identifying representations from said successively selected storage positions of said storage means, writing means settable to re-enter a readout character into either the same or the next sequential character storing position of said storage means, a cyclically operating control means to render said selecting means, said reading means and said writing means operable in a predetermined order during each cycle, a display unit connected to said storage means to visually present representations of characters as they are read from said storage means and in a display location corresponding to the storage address of said characters in said data, an entry means selectively settable to designate editing operations to be performed on said data, and means controlled by said entry means and by said reading means when a stored identifying representation is read from a storage position to selectively alter the setting of said control means to change said predetermined order during a cycle whereby the data representations in said storage means will be rearranged to perform said designated editing operations.

4. An editing apparatus as recited in claim 3 wherein said display means is controlled by said reading means to present said character representations in a rectilinear array and to visually emphasize said characters having an identifying representation stored therewith and wherein said entry means includes controls selectively operable to alter said reading means and said writing means to change the stored identifying representation from the storage position of the emphasized character to the storage position of an adjacent character in any rectangular direction of said display means.

5. An automatic editing apparatus including a storage means having sequentially addressable groups of selectively conditionable storage elements, the elements of each group being combinationally conditionable to states representative of any one of a plurality of characters, addressing means to generate sequential storage addresses and reading and writing means to respectively detect or set the combinational state of the addressed group of elements, an output character register to receive a character representation from the read means, an input character register to retain a character representation to be written into said storage means, a manual entry device including operable character representing devices and operable control members, selective connections from said output character register to said writing means and to said input means, a display unit connected to said output character register to present another representation for each output character representation at a display position corresponding to the address in said storage means from which the character representation was read, a cyclic control means normally operating to selectively enable said addressing means, said reading and writing means, said selective connections and said character registers whereby the characters represented by the conditions of successive groups of storage elements are continuously read from and written back into the same group of storage elements with concomitant presentation of said characters by said display means, an extra settable storage element for each group of elements, said element being settable under control of said cyclic control means to designate the character representation in the associated group of elements, a display control means controlled by said reading means when a set one of said extra storage elements is read to intensify the display of the associated character representation and means variously settable by said operable control members to alter the operation of said cyclic control means to enable selected operations to be performed on the designated one of said character representing signals.

6. A data editing machine comprising a storage means having a plurality of sequentially addressable groups of storage elements, each group being combinationally settable to store a representation of a character of data and an associated designating signal, a readout means to read a stored character and an associated designating signal from a selected group of storage elements, a writing means to record a character and its designating signal, if any, in a group of storage elements and an address counter controlling said reading and writing means to select one group of storage elements to be acted upon, said address counter being changeable by a unit of address in either an incrementing or a decrementing mode, an output character buffer register to temporarily store a character representation from said reading means, a manual entry means, an input buffer register selectively settable by said output buffer register or by said manual entry means, gating means to selectively connect said writing means to said input buffer or to said output buffer, a display unit connected to said output buffer to present each readout character representation at a display location corresponding to the address of the group of storage elements and responsive to reading out of a designating signal to emphasize the presentation of the associated character, a storage control means normally operating cyclically to enable said reading means to readout a character into said output buffer, to thereupon connect said output buffer to said writing means to enable said writing means to rewrite said character back into the same group of storage elements, and to then change said address counter, said storage control means being settable by said manual entry means when a character has been set into said input buffer and by said output buffer when a designating signal is detected therein to change the connection of said writing means from said output buffer to said input buffer for a single storage control means cycle whereby the character in said input buffer replaces the stored character stored in said output buffer, said storage control means when so set causing retention of said designating signal in said output buffer until after readout of the subsequent stored character whereby said designating signal is transferred into association with the subsequent character.

7. A machine as set out in claim 6 in which said manual entry means includes an insert control member operable in conjunction with entry of a character representation from said manual entry means into said input buffer to cause said storage control means to respond to detection of said designating signal by connecting said writing means to said input buffer to record said manually entered character representation and to then connect said output buffer to said input buffer whereby character representations read out of a group of storage elements are temporarily retained in said input buffer for recording in a group of storage elements adjacent to the group from which they were read out.

8. A data editing device comprising a storage means having a plurality of sequentially addressable groups of character storage elements, each group capable of storing a combination of signals representing a data character and an associated designating signal, reading means to read a group of storage elements, an output buffer to receive the character representing signals read by said reading means, a writing means to combinationally set a group of storage elements to represent a character and its designating signal, an input buffer selectively settable to represent a character, a manual character entry device, connections selectively settable to connect said writing means for control by said output buffer or by said input buffer and other connections selectively settable to connect said input buffer for setting by said output buffer or by said manual entry device, a storage group address counter to select one group of storage elements for reading or writing operations, selectively operable means to increment or to decrement the address in said counter, a display device to present an assembled representation of all of said data characters, each character representation being presented at a display location corresponding to the address at which the character representation was stored, storage control means cyclically operable to normally energise said reading means to set said output buffer to represent a character and any associated designating signal, to energise said writing means to record the character stored in said output buffer and to then energise said selectively operable means to increment said address counter to enable reading of the character representation stored in the storage element group with the next sequential address, said storage control means being settable by said manual entry device when both a designating signal is received by said output buffer and a character representation has been stored in said input buffer whereby the character representation in said input buffer is stored in the addressed group of storage elements in place of the character read from that group and a second control device included with said manual entry device to further set said storage control device included with said manual entry device to further set said storage control means to connect said input buffer for setting by said output buffer immediately after said manually entered character representation is written whereby a character representation read out of a group of storage elements may be retained in said input buffer until the character representation stored in the group with the next sequential address is read out into said output buffer thereby clearing said next sequentially addressed group whereupon the writing means is energised by said storage control means to write the character representation in the input buffer into said next group.

9. A data editing machine as set out in claim 8 including a third control device included with said manual entry device and operable to enable deletion of the character representation having an associated designating signal and writing of each subsequently read character representation in the group of storage elements of next lower sequential address, a character recognition device settable by reading out of a particular character representation while said deletion control device is set to control said address counter to cyclically decrement the address therein, and to additionally set said storage control means to connect said input buffer to said output buffer whereby a character representation read out of a group of storage elements may be transferred from said output buffer to said input buffer until the character representation stored in the next lower sequentially addressed group is read out to said output buffer, thereby clearing said next lower group so that the character in said input buffer may be written into said next lower group, means operated upon detection of a character designating signal in said output buffer to switch said writing means from said input buffer to said output buffer after transfer of said designated character representation to said input buffer whereby said designated character representation but not said character designating signal is omitted from rerecording, and a detecting device effective upon detection of a second character designating signal in said data to cause a repetition of said deletion cycle to delete the newly designated character representation.

10. A data editing device comprising a data storage means having a plurality of sequentially addressable groups of storage elements, each group for storing a representation of a character and a designating symbol, an address counter to indicate a group of storage elements and selectively settable to cyclically increment or decrement the address therein, a reading means to clear a character representation including any designating signal from the indicated group of elements, an output buffer register to store a readout character representation and its designating symbol, an input buffer register, a writing means to store a character representation in an addressed group of storage elements, a display means connected to said output buffer to present representations of characters as they are read out of said storage means, an input connection for said writing means and selectively controlled by either said output buffer or said input buffer, a manual character entry device having operable character representing members, another input connection to selectively connect said input buffer to either said output buffer or said entry device and a cyclic storage control device normally operating in a first mode wherein said reading means is activated to read out a character representation from an addressed group of storage elements into said output buffer and said character representation is supplied by way of the first input connection from said output buffer to said writing means, wherein said writing means is then set to rerecord said character representation in the same group of elements and said address counter is then incremented prior to initiation of a following read operation, said storage control device being settable to a replacement mode wherein operation of a character member of said entry device enters a character representation in said input buffer, switching means in said storage control and responsive to such entry together with the presence of a designating symbol in said output buffer to switch said first input connection from said output buffer to said input buffer for the ensuing cycle of said control device whereby the character representation in said input buffer replaces the character representation stored in the storage element group having the stored designation symbol.

11. A data editing device as set out in claim 10, including a character insertion control member in said manual entry device said member being settable to coact with an operated character member and with said reading means when a designating symbol is sensed thereby to set said writing means input connection to connect said writing means to said input buffer to enter the character representation set in said input buffer by said operated character member into said addressed storage group and to then set said storage means control device into an insert mode of cyclic operation wherein said input buffer is connected to receive a readout character from said output buffer, said address counter is then incremented to select the adjacent group of storage elements, said reading means is next operated to read out the character representation in said adjacent group to said output buffer, said writing means is then activated to record the character representation previously stored in the input buffer into said adjacent group whereby a character selected by operation of said manual entry device is recorded in place of the character representation having the designation symbol and such designated character representation and successively read character representations are sequentially rerecorded into the next addressable group.

References Cited by the Examiner

UNITED STATES PATENTS

| | | | |
|---|---|---|---|
| 3,007,137 | 10/1961 | Page et al. | 340—172.5 |
| 3,010,095 | 11/1961 | Dirks | 340—172.5 |
| 3,011,154 | 11/1961 | Dirks | 340—172.5 |
| 3,012,230 | 12/1961 | Galas et al. | 340—172.5 |
| 3,013,250 | 12/1961 | Maley | 340—172.5 |
| 3,037,192 | 5/1962 | Everett | 340—172.5 |

ROBERT C. BAILEY, *Primary Examiner.*

MALCOLM A. MORRISON, *Examiner.*

W. M. BECKER, *Assistant Examiner.*